US009521207B2

(12) United States Patent
Lok et al.

(10) Patent No.: US 9,521,207 B2
(45) Date of Patent: Dec. 13, 2016

(54) UNIFIED INTEGRATION MANAGEMENT—CONTACT CENTER PORTAL

(75) Inventors: Shek Hung Lok, Hong Kong (CN); Ravin Dimantha, Hong Kong (CN)

(73) Assignee: PROTEL COMMUNICATIONS LIMITED, Hong Kong (CN)

( * ) Notice: Subject to any disclaimer, the term of this patent is extended or adjusted under 35 U.S.C. 154(b) by 2663 days.

(21) Appl. No.: 10/435,686

(22) Filed: May 9, 2003

(65) Prior Publication Data

US 2004/0028212 A1 Feb. 12, 2004

Related U.S. Application Data

(60) Provisional application No. 60/379,119, filed on May 9, 2002, provisional application No. 60/454,067, filed on Mar. 12, 2003.

(51) Int. Cl.

| G06F 15/173 | (2006.01) |
| H04L 29/08 | (2006.01) |
| G06F 17/30 | (2006.01) |
| H04M 3/51 | (2006.01) |

(52) U.S. Cl.
CPC ..... *H04L 67/2823* (2013.01); *G06F 17/30873* (2013.01); *H04L 67/02* (2013.01); *H04L 69/329* (2013.01); *H04M 3/5191* (2013.01)

(58) Field of Classification Search
CPC ........ H04M 3/56; H04M 3/22; H04M 7/0024; H04L 12/1813; H04L 12/2493
USPC ........................................................ 709/223
See application file for complete search history.

(56) References Cited

U.S. PATENT DOCUMENTS

| 5,960,073 | A | 9/1999 | Kikinis et al. |
| 6,286,033 | B1 | 9/2001 | Kishinsky et al. |
| 6,332,163 | B1 * | 12/2001 | Bowman-Amuah ......... 709/231 |
| 6,339,593 | B1 | 1/2002 | Kikinis |
| 6,418,448 | B1 | 7/2002 | Sarkar |
| 6,446,110 | B1 | 9/2002 | Lection et al. |
| 6,459,697 | B1 | 10/2002 | Neyman |
| 6,574,605 | B1 * | 6/2003 | Sanders et al. .............. 705/7.26 |
| 6,724,887 | B1 * | 4/2004 | Eilbacher et al. ....... 379/265.03 |
| 6,791,974 | B1 * | 9/2004 | Greenberg .................... 370/352 |
| 7,068,680 | B1 * | 6/2006 | Kaltenmark et al. ......... 370/469 |
| 2002/0049749 | A1 | 4/2002 | Helgeson et al. |
| 2002/0073236 | A1 | 6/2002 | Helgeson et al. |

(Continued)

*Primary Examiner* — Esther B Henderson
(74) *Attorney, Agent, or Firm* — David D. Brush; Westman, Champlin & Koehler, P.A.

(57) ABSTRACT

A system and method is disclosed for providing web and portal enablement of a CTI-based call center, via markup languages and middleware technologies such as XML, J2EE, Web Services, and Message Oriented Middleware (JMS/MOM) technologies. The invention encompasses a system for translating data (including voice and telephony data) and events using a metadata translation layer, which transforms and encapsulates telephony data and events into well-formed markup language syntax. The translated data is then be passed through one or more industry standard interfaces (such as a native interface, XML interface, or web service) to corresponding clients (thin client, native client, e-business application client, wireless clients, etc.) for remote use of information and applications via the web or other browser based portal over any packet-based network.

6 Claims, 25 Drawing Sheets

(56) References Cited

U.S. PATENT DOCUMENTS

| | | |
|---|---|---|
| 2003/0007624 A1 | 1/2003 | Handel et al. |
| 2003/0198334 A1* | 10/2003 | Huang et al. ............ 379/265.02 |
| 2003/0212654 A1* | 11/2003 | Harper et al. .................... 707/1 |
| 2004/0131082 A1* | 7/2004 | Evans et al. .................. 370/469 |
| 2005/0165658 A1* | 7/2005 | Hayes et al. .................... 705/26 |
| 2005/0175971 A1* | 8/2005 | Mcilwaine et al. .......... 434/219 |

* cited by examiner

XML Schema Definitions

| Schema Name | Description | Usage |
|---|---|---|
| xCTL | Extensible Computer Telephony Language | To communicate between CTI servers and the CC Portal Application Server. CTI events and data are transformed into XML messages based on this schema. |
| xCDL | Extensible Client Data Language | The client applications use the xCDL schema to compose XML messages that they sent to the CC Portal (e.g. SoftPhone Applet) |
| xIVRL | Extensible IVR Language | To communicate between IVR systems and the CC Portal Application Server. IVR data are transformed into XML messages based on this schema. |
| xDQL | Extensible Data Query Language | The query/response XML messages between the Module Container and the Data Engine are composed using this schema |
| xCRML | Extensible CRM Language | To communicate between CRM systems and the CC Portal Application Server. CRM data are transformed into XML messages based on this schema. A subset of the schema is used to pass CRM and customer data to/from client applications (e.g. SoftPhone Applet). |
| xRIFDL | Extensible RIF Definition Language | All the configuration data of the CC Portal system are defined using this schema. |
| | | |

FIG 18

In Coming Call Event form CTI Adaptor

Transfer Call Event

Dial Call Event

Answer Call Event

Hold / Un-hold Call Event

Attach Data Event

Destroy Data Event

Retrieve Data Event

Agent CTI Login Event

UNIFIED INTEGRATION MANAGEMENT—CONTACT CENTER PORTAL

This application makes a claim of priority from U.S. Provisional Application No. 60/379,119, entitled "Rendezvous Integration Framework," filed May 9, 2002 in the name of Lok et. Al, and from U.S. Provisional Application No. 60/454,067, entitled "Contact Center Portal," filed Mar. 12, 2003 in the name of Lok et. Al, both of which are assigned to ProTel Communications Ltd., the assignee of the present invention, which applications are fully incorporated by reference herein.

BACKGROUND OF THE INVENTION

1. Field of the Invention

This invention relates generally to a system and method for providing web and portal enablement of a call center, and more specifically, enabling access and control to traditional CTI-based call centers by leveraging markup language and middleware technologies. In particular, the system provides ubiquitous access to enterprise call center's system information and applications through the use of a middleware application server and an infrastructure server, via any packet network.

2. Description of Related Art

Traditional Call Centers (CC) consist of various CC component systems, such as Automatic Call Distribution (ACD) systems, Computer Telephony Integration (CTI) servers, and Interactive Voice Response (IVR) systems. The basic architecture used in present systems to integrate all these components is based on a client/server approach. One deficiency of this approach is the lack of scalability and flexibility to address current dynamic business needs. Whenever there is a change to any component (e.g. version upgrade, bug fix, etc. . . . ) it requires substantial work and resources to make changes to other components integrated with, or connected to it, to reflect the changes and to maintain the original state of integration and functionality of the system.

In addition, such methods of CC integration cannot easily provide access to CC system and CC information and applications through the web (i.e. any browser-based environment, such as the Internet, WWW, WAN, LAN, or WLAN). In current CC operations, most workers, including CC agents, supervisors and managers are very mobile. Traditional methods of CC integration hinder this mobility by restricting the access and control of CC's information and CC applications only through dedicated PCs located within the CC. Since these traditional methods employ a client-server architecture, it requires the client PC to have sufficient CPU power to be pre-installed with corresponding applications before it can access the information required or use the applications. As such, general PCs or other portable devices such as thin clients, mobile phones, PDAs, and tablet PCs are unable to access these information and applications, since they lack the required pre-installed applications or the necessary CPU power.

It would be desirable to provide a unified and integrated contact center portal system and method designed with an n-tiered architecture, which can enable easy integration of various CC applications and allow easy access and control to enterprise CC applications through web and wireless connections (through PCs, thin client PC's, mobile phones, PDAs, and tablet PCs), with little or no changes to the enterprise CC system. In so doing, a layer of abstraction is provided between the various integrated components of the CC, thereby shielding them from the complexities of each other, making it easier to upgrade, and to change the CC environment with little or no impact to the other components already integrated in the environment. There is therefore a need for providing a web enabled, wireless accessible CC solution through the use of a middleware application server, and an infrastructure server which overcomes the shortcomings in the prior art.

SUMMARY OF THE INVENTION

The current invention encompasses a system and method for translating data and events using a metadata translation layer, which transforms and encapsulates telephony data and events into well-formed markup language syntax. The translated data may then be passed through one or more industry standard interfaces (such as a native interface, XML interface, or web service) to corresponding clients (thin client, native client, e-business application client, wireless clients, etc) for remote use of information and applications via the web or other browser based portal.

The present invention discloses a unified integration management (UIM) CC system and method for enabling web and browser portal based access and control of traditional CTI based CCs using XML, J2EE, Web Services, and Message Oriented Middleware (JMS/MOM) technologies.

In one aspect of the present invention, there is provided an application server for performing operations using an extensible markup language (such as XML). The application server of the present invention can accommodate and process complex XML data structures, which are propagated via various application adapters plugged in to the system. A data engine component of the application server provides access to enterprise data sources. The data engine opens data sources as relational, structured files via data adapters. In one example system described in detail below, these consist of JDBC, or Web Services.

In another aspect of the present invention, there is provided an infrastructure server for performing operations on a web based markup language (such as such as HTML, cHTML and WML). The infrastructure server of the present invention is made up of commercial or open source implementations of a JSP/Servlet container and a Portal container. The infrastructure server contains the JSP/Servlet container and the Portlet container (such as the Apache Tomcat JSP and Servlet container by Apache Software Foundation, which is currently located and described in detail at http://jakarta.apache.org/). The Portlet container can be any container that complies with the JetSpeed enterprise information portal from Apache Software Foundation. The JSP/Servlet and Portlet containers together form the infrastructure server of the present invention.

In yet another aspect of the present invention, an "n-tier" architecture is provided for enabling system scalability and component integration. The use of MOM as the transport backbone to send and receive events and data to and from the CC Portal to the call center components and passing them on to the clients, is a key enabling factor of the current system. Using the MOM, various call center components can be integrated into the system, and the CC Portal can be extended to include other enterprise application such as CRM, ERP and SCM.

In still another aspect of this present invention, a distributed architecture is provided for enabling the various system components and functional modules to be distributed across multiple physical systems according to the current invention, with messages being passed between each module in XML format.

In a further aspect of the present invention, a message flow process is provided for queuing, listening, and sending messages between the various components and functional modules.

In still a further aspect of the present invention, a user interface is provided for allowing a human operator to interact with the web enabled application components. The GUI and logic of the UIM CC Portal is clearly separated using the n-tier architecture. The CC Portal generally employs an enterprise information portal approach to the user interface.

The current invention can be implemented in a CC to enable customizable, and web based CC applications, thereby allowing CC applications to be accessed remotely by users. It can also provide web-based access and integration to other enterprise software components such as Enterprise Resource Planning (ERP), Supply Chain Management (SCM), and Customer Relationship Management (CRM), by the UIM CC PIS.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIG. 18 is a table showing various XML schema definitions for use in conjunction with the present invention.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims. This invention has been described herein in reference to various embodiments and drawings. It will be appreciated by those skilled in the art that variations and improvements may be accomplished in view of these teachings without deviating from the scope and spirit of the invention.

All publications referenced herein are fully incorporated by reference as if fully set forth herein.

The present invention can find utility in a variety of implementations without departing from the scope and spirit of the invention, as will be apparent from an understanding of the principles that underlie the invention. For instance, the present invention is not limited to use solely in CC applications, but may be used in, and the concepts described herein applied to other enterprise applications that require standards-based integration to other systems/applications, as well as to web and portal enablement of applications that require remote access via a packet network such as the Internet, Intranet, or even through WLANs (Wireless Local Area Networks).

Overall System Design

The system and method of the present invention make use of the J2EE 1.3 specification, XML, Java, JavaBean, Java Message Service (JMS), and Message Oriented Middleware (MOM) technologies. These technologies and related code specifications are well known, and currently available in various forms from Sun Microsystems, and other companies. More detailed descriptions of these technologies are currently available at the following Internet sites: http://java.sun.com/products/; http://java.sun.com/products/jms/; http://java.sun.com/j2ee/; http://java.sun.com/xml/. The above Internet references are hereby incorporated by reference, as if fully laid out herein.

Figure 1:
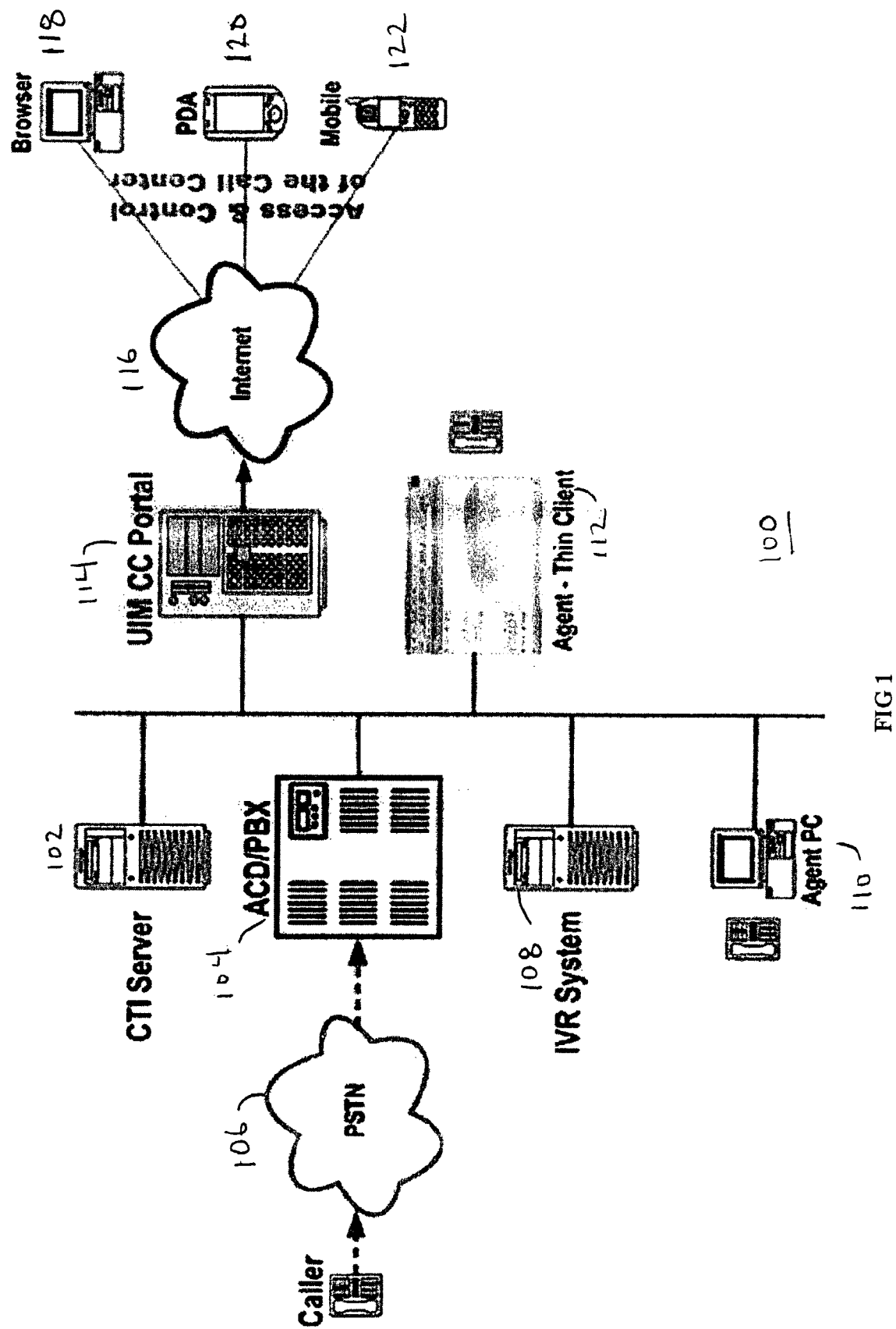
FIG. 1 is a schematic diagram showing the UIM CC portal of the present invention in a traditional CC setting.
Figure 15:
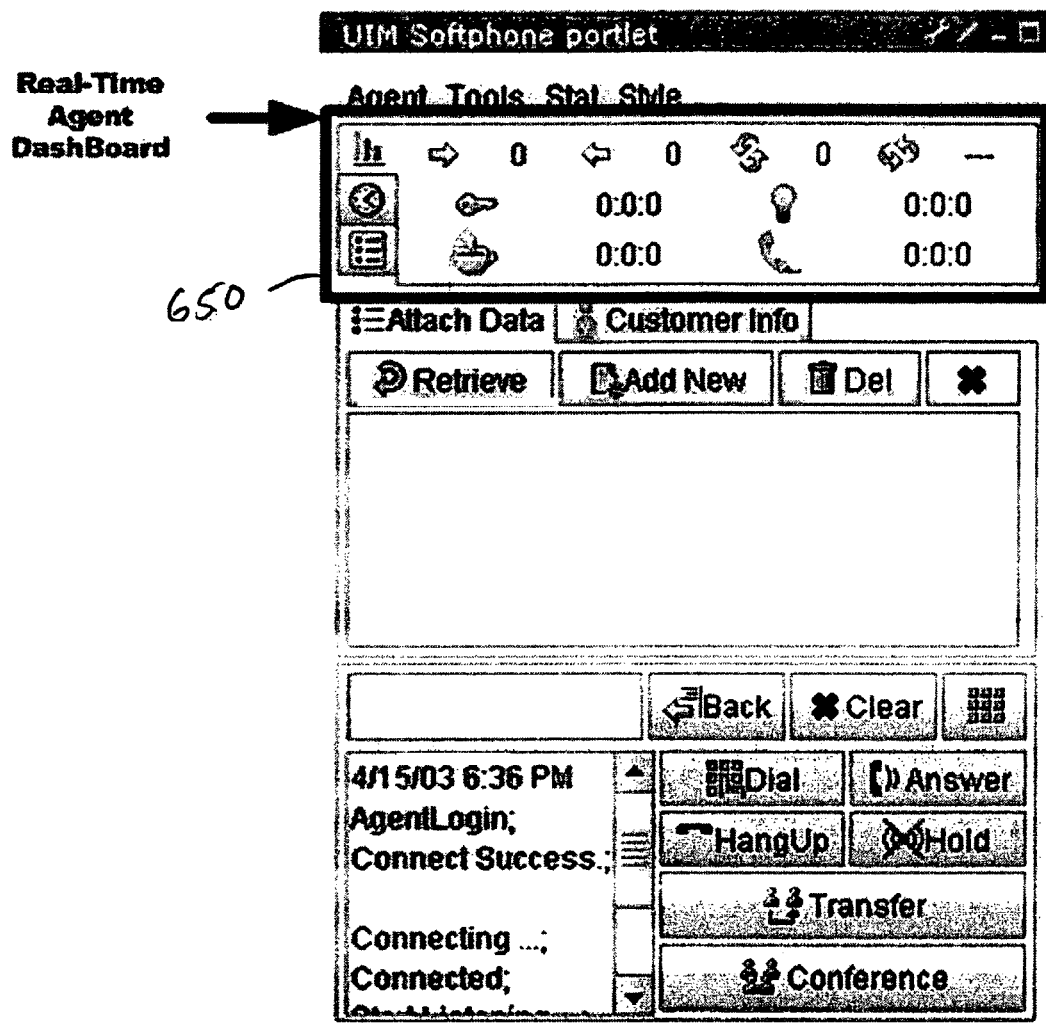
FIG. 15 is a diagram showing a softphone application using the stat server and reporting engine.

The current invention is able to be implemented into existing enterprise CC infrastructure as shown in FIG. 1 without the need to change the existing systems. The UIM CC Portal 114 of the current invention, which is based on an n-tiers architecture, can enable easy integration with other enterprise applications and allow easy access and control through web and browser based portal clients (including Browser capable PC's 118, Thin Client PC's 112, PDA's 120, Tablet PC's, and cell phones 122). Any subsequent change to individual component within the systems, will only impact that particular application adapter modifications, thereby isolating the whole system from the change. One aspect of the inventive system allows a CC agent to work from home after login to a portal through his/her home PC via the Internet of other network. By using applications enabled by the current invention, such as a softphone application 650 (shown in FIG. 15) on the browser, the agent can perform all telephony control including answer, transfer, conference, etc as if the agent were present in the physical location of the CC. CC managers and officers are also able to retrieve updated information about the performance of their CC through PDAs or other portable wireless devices when they are outside of the CC location. Such functions and features are highly desirable, especially should the CC experience an outage or access is denied for CC agents (for example during a time of health quarantine or the like). The solution presented by this invention can allow the CC to continue providing the same quality level of services to their call-in customers.

The UIM CC Portal System of the present invention is configured with an n-tiered architecture (see FIG. 6), which enables the integration of various applications and allows easy access and control of enterprise CC applications through internet, wireless, mobile and PDA clients. The CC Portal generally conforms to the J2EE 1.3 specification, and includes clearly distinguished Client, Web, Enterprise Java-Bean (EJB), and Enterprise Information System (EIS) tiers. The system also includes a message flow architecture, comprising a customer adapter, universal message router (UMR), and module container. The UIM CC Portal functions as a middleware application, connecting traditional CC components (from an existing enterprise application) to the CC Portal via a suite of adapters. The adapters transform component events and related data into a set of XML messages based on sets of predefined schemas. Upon receiving the various XML messages, the CC portal transforms and routes them to predefined application modules (in the module container) for handling.

Figure 4:
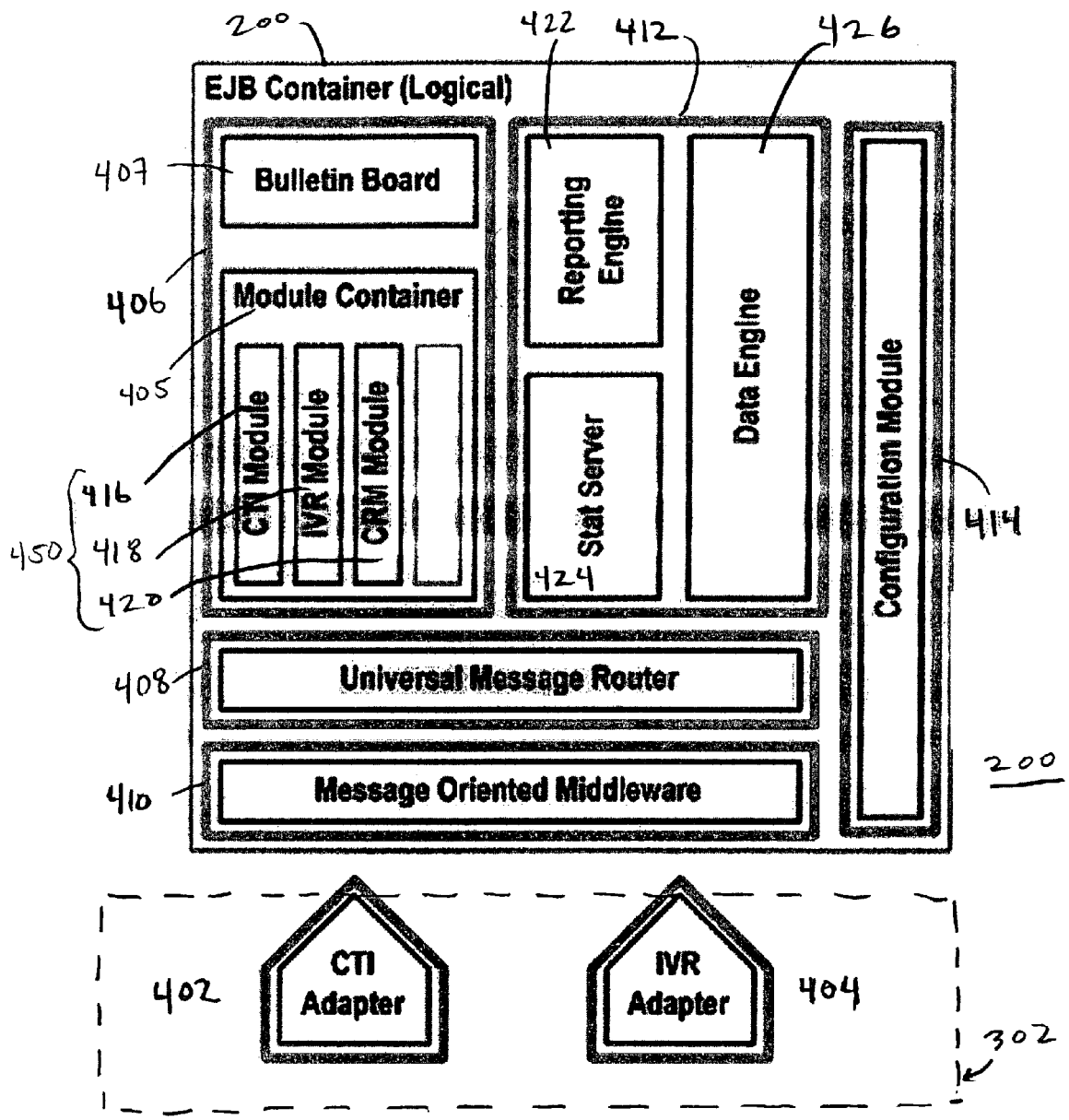
FIG. 4 is a schematic diagram showing the distributed architecture of the UIM CC portal of the present invention.

The UIM CC Portal system architecture is also distributed, wherein groups of system components can be deployed on separate physical devices. Therefore, the CC portal architecture is distributable as well as horizontally scalable, making it ideal for very large, geographically dispersed call centers. For instance as depicted in FIG. 4, each group of components can be deployed on a separate physical machine. This design architecture differs from traditional distributable systems which employ Microsoft's Distributed Component Object Model (DCOM), Sun Microsystems' Java/Remote Method Invocation (Java/RMI) or OMG's Common Object Request Broker Architecture (CORBA), which are synchronous remote procedure calls. The logical group of Module Container 405 and the Bulletin Board 407 interacts with the Universal Message Router 408 by way of asynchronous XML message passing. The MOM 410 can be any commercially available product conforming to the Java Message Service API. The current invention derives the reliably and connection oriented architecture of the MOM employed.

Figure 2:
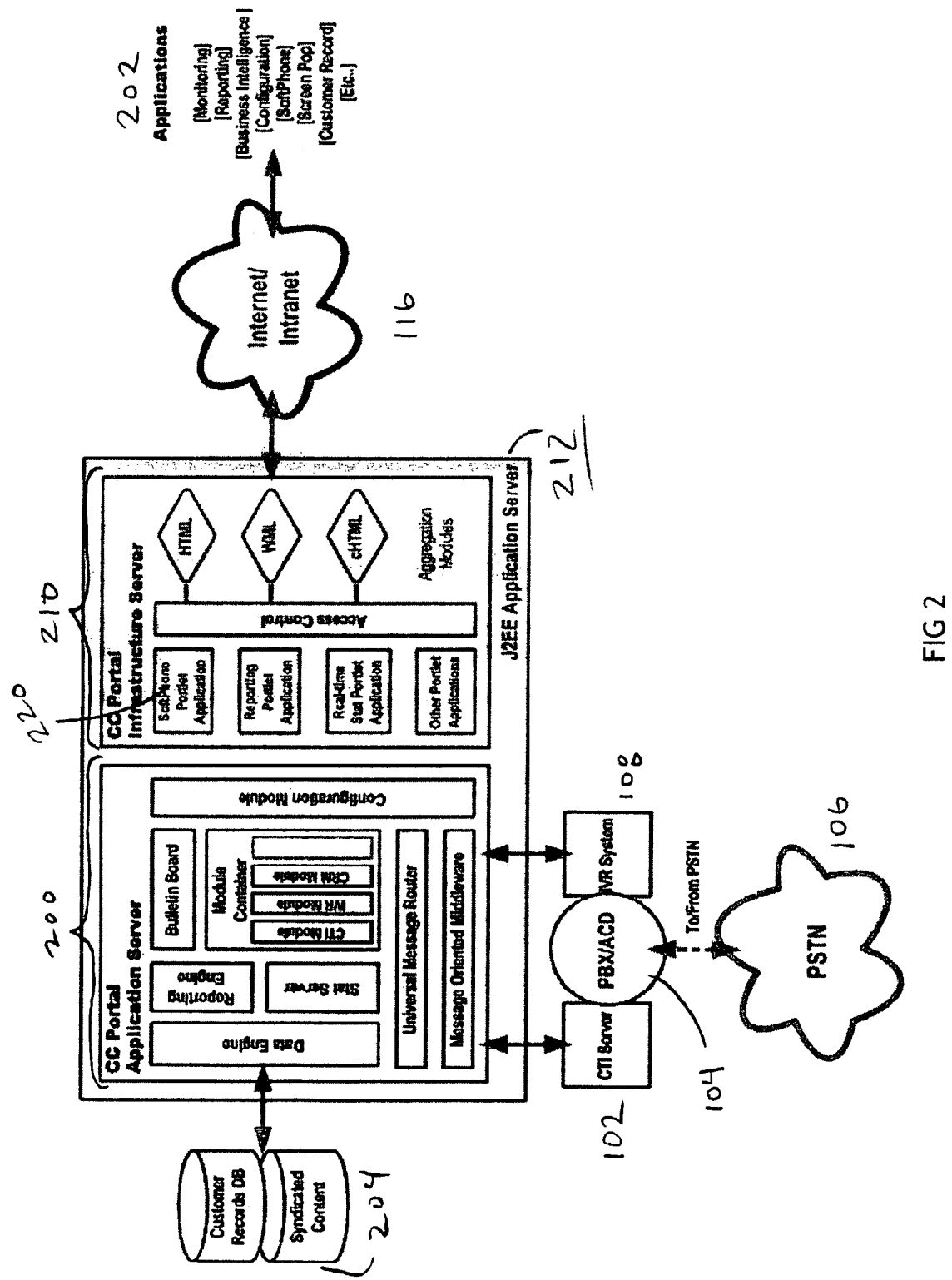
FIG. 2 is a schematic diagram showing the UIM CC portal of the present invention.

As shown in FIG. 2, the J2EE server 212 of the current invention includes both applications server 200, and infrastructure server 210. The infrastructure server 210 contains the JSP/Servlet container and the Portlet container (such as the Apache Tomcat JSP and Servlet container by Apache Software Foundation, which is currently located and described in detail at http://jakarta.apache.org/). The Portlet container can be any container that complies with the JetSpeed enterprise information portal from Apache Software Foundation. The JSP/Servlet and Portlet containers together form the infrastructure server of the present invention, which performs operations on web based markup languages.

N-Tier System Architecture

Figure 6:
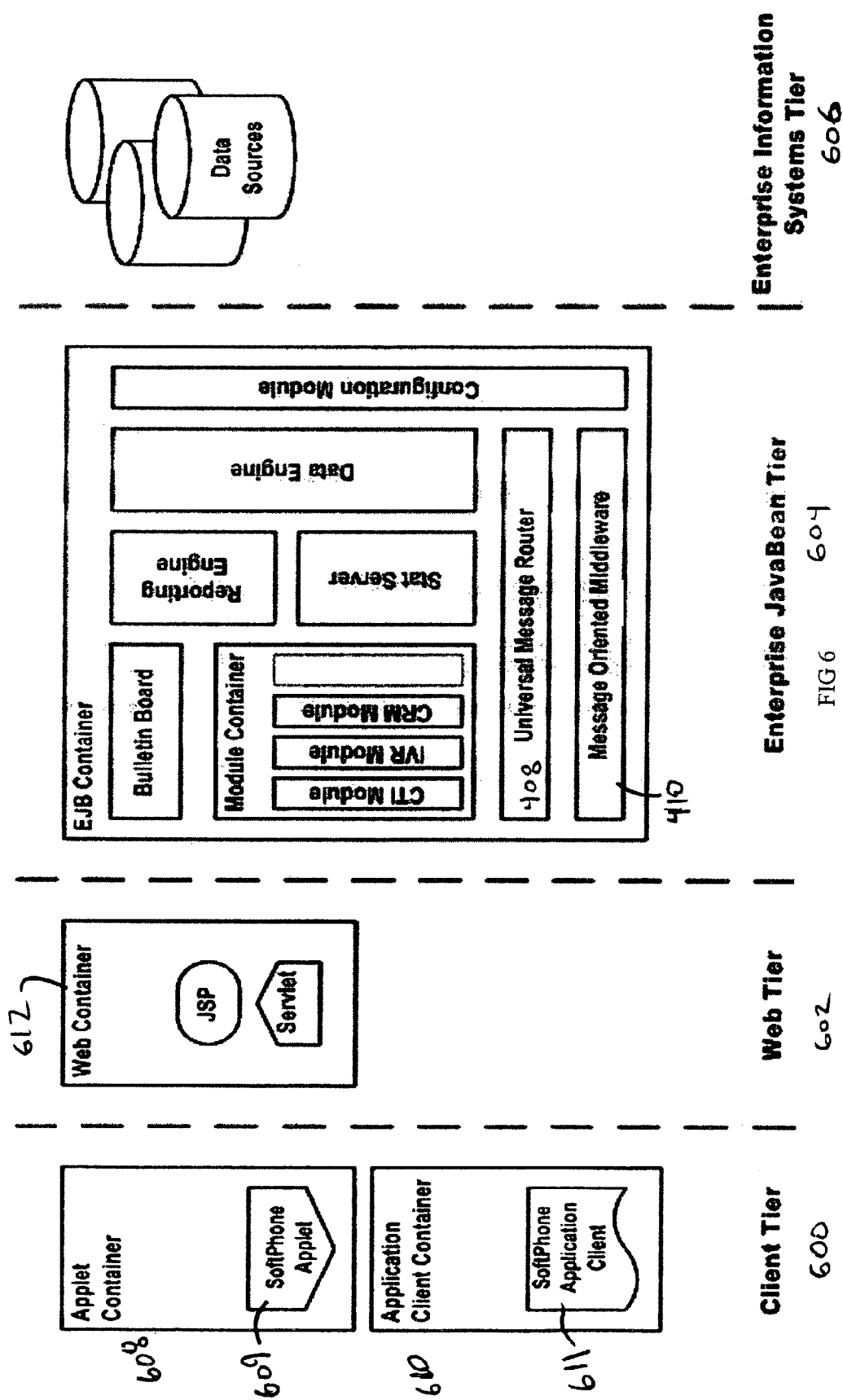
FIG. 6 is a schematic diagram showing the tiered architecture of the UIM CC portal of the present invention.

The CC Portal generally conforms to the J2EE 1.3 specification, and includes a clearly distinguished Client Tier 600, Web Tier 602, Enterprise JavaBean (EJB) Tier 604, and Enterprise Information Systems (EIS) tier 606, which enable system scalability and component integration as shown in FIG. 6. Generally, the Client tier 600 is for providing client side access to CC applications through the use of HTML, Java Applets, JavaScripts etc. It can also contain standalone applications which directly communicate to the Enterprise JavaBean (EJB) tier 604 using the protocol supported by the EJB tier, such as Java Messaging Service (JMS) or Remote Method Invocation/Internet Inter-ORB (Object Request Broker) Protocol (RMI/IIOP). Even though the client side browsers could handle some of the presentation, most of the logic for generating CC application presentations is done in the Web tier 602 using JSPS, Servlets, XML, XSL etc., to support the different kinds of browsers and present the content in a meaningful way. All the business logic of the CC applications is implemented in the EJB tier 604 which uses EJBs and other J2EE technologies to deploy the application as scalable and distributed granular components and services. In addition, this layer also contains data access beans and other data access components to connect to relational databases. The EIS tier 606 typically consists of a distributed set of relational databases, which is integrated to the EJB tier 604 using Java Database Connectivity (JDBC), which could be used to access a wide variety of databases in a uniform way. This tier may also contain other legacy systems, which integrate to the CC applications using a variety of technologies depending on the exact nature of the backend system.

Figure 35:
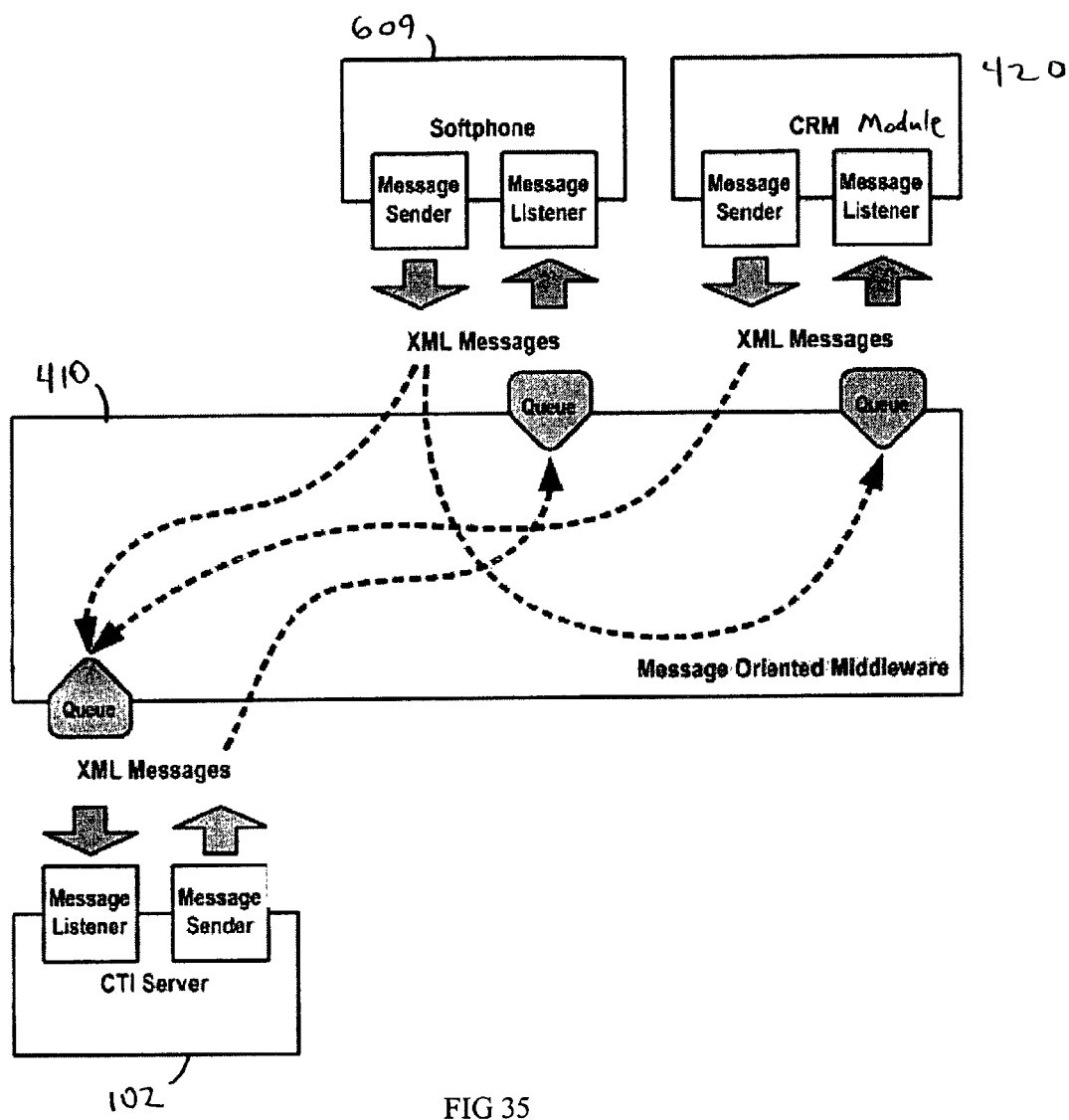
FIG. 35 is a schematic diagram showing the hub and spoke architecture of the MOM according to the current invention.

The use of MOM 410 as the transport backbone to send and receive events and data to and from the CC Portal to the call center components and passing them on to the clients, is a key enabling factor of the current system. The MOM 410 provides an Enterprise Application Integration (EAI) framework for the call center application. The MOM 410 implements a hub and spoke architecture (shown schematically in FIG. 35) where different CC components (such as the CTI server 102, IVR system 108, softphone applet 609 or CRM systems) are connected to MOM 410 and in turn to each other through the MOM 410. Using the MOM 410, various call center components can be integrated into the system, and the CC Portal can be extended to include other enterprise application such as CRM, ERP and SCM. Some of the inherent features of the MOM architecture and how they are exploited in the UIM CC system architecture are described below.

The asynchronous nature of the MOM 410, enables clients (Softphones, Real-time Dashboards, etc) and other CC components (CTI server, IVR system, etc) that are connected to the CC Portal; free to perform other operations while waiting for a response from the CC Portal or vise-a-versa. As opposed to the blocking nature of other Remote Procedure Call (RPC) based integration schemes (RPC is synchronous the connect application is 'blocked' until an acknowledgements is received.)

MOM 410 allows many responses to one request or many requests to one response; this feature is very useful in CC Portal of the current invention. For instance, a single CTI request to the CTI server might result in more than one response. With traditional RPC type integration, these multiple responses need to be buffered, and the final data set is sent as a return value of a procedure call. This buffering introduces a delay in the responses coming back to the CC Portal. In a CC where voice must be transferred in real-time, the corresponding data cannot be delayed. In the CC Portal of the current system, separate events are handled as discrete messages by the MOM 410 architecture. Therefore, when an event is received it will be sent to the CC Portal without buffering or without waiting for the other events to arrive. The MOM 410 is thus suitable for applications with long transaction lifetimes, such as a telephone conversation.

The MOM 410 supports priority/load-balancing by allowing retrieval of messages off the queue in any order which is typically a difficult feature to implement with traditional RPC type integration without extensive buffering to examine the type of data returned. The UMR implementation shown in FIG. 8 makes extensive use of this priority/load-balancing feature of the MOM 410. The routing rules 362 defined in the UMR makes use the out-of-order processing of messages. For instance, the UMR gives higher priority to CTI event messages over CRM data messages as CTI events need to be synchronized with the real-time nature of the voice call. The MOM implementation of the current invention also supports fault tolerance in that persistent queues allow messages to be recovered when one component fails. Therefore, even if the recipient of the message is unavailable its stores in the queue until such time the recipient is available. In the meantime, the sender is not blocked.

The MOM implementation of the current invention is also able to support legacy systems and widely dispersed systems, which is ideally suited for CC use as CC's contains large cross section of systems and different platforms. For instance the CentreVu CTI Server (CvCT) by Avaya™ Systems Inc. runs on Novell™ and Microsoft Windows™ platforms, the Avaya™ Conversant UVR System runs on SCO UnixWare, and the Avaya™ Predictive Dialer (Mosaix) runs on HP-UX. The MOM has its native implementations of message senders and listeners on all of these platforms, as against DCOM, which only has a Windows™ implementation, and RMI is preliminarily Java based. As such, implementing RMI on any platform is superseded by the availability of the platform specific Java Virtual Machine (JVM).

Figure 3:
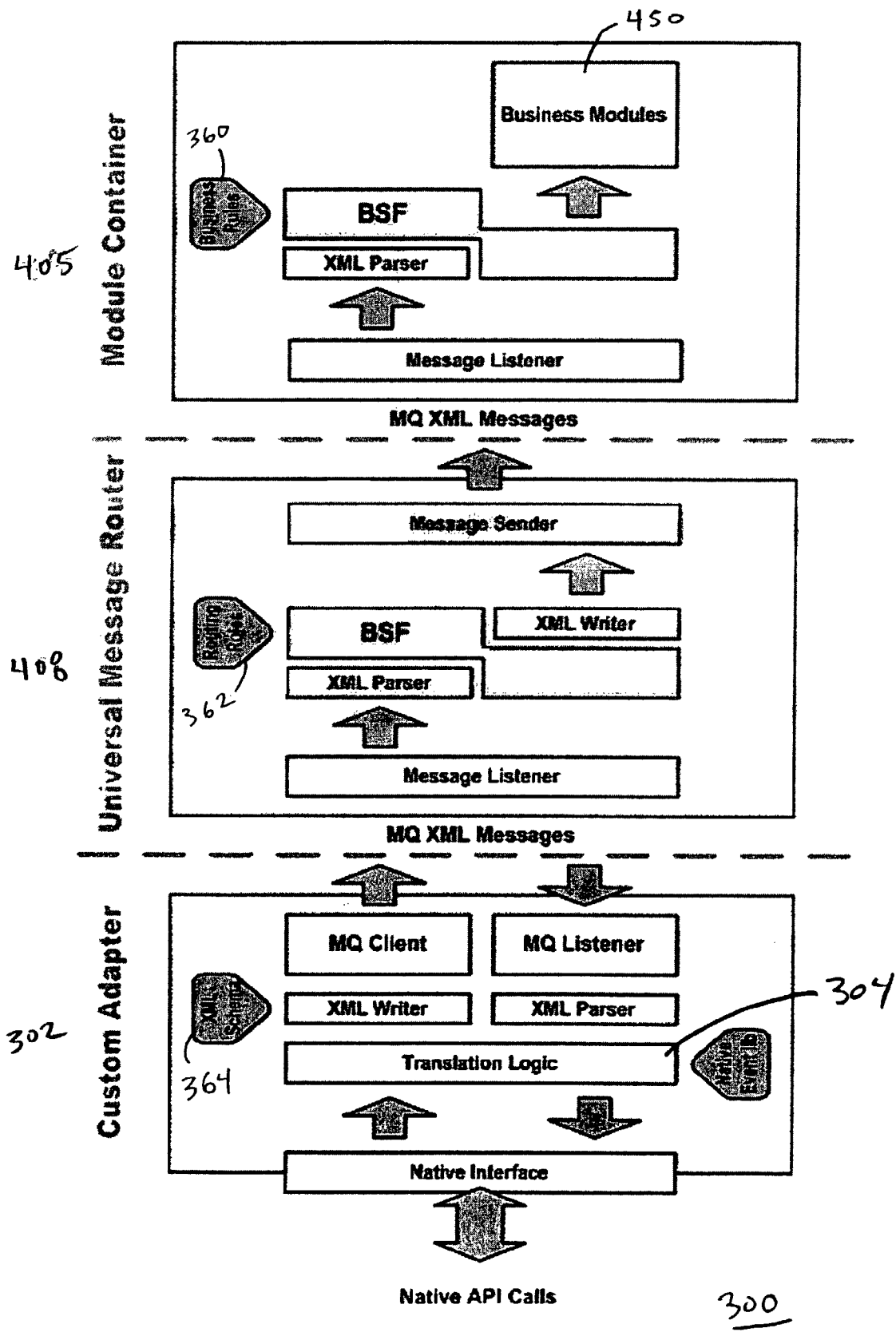
FIG. 3 is a schematic diagram showing the message flow in the current invention.

Since the messages are composed based a standard XML schema 364 (shown generally by the table in FIG. 18), third party vendors can easily integrate their CTI servers 102, the IVR systems 108 or any other EIS 606 into the CC Portal without the knowledge of the internal mechanisms of the current invention through use of the XML schema (FIG. 18), and the CC Portal Universal Message Router (UMR) 408. The UMR 408 is configured to accept incoming XML messages and route them to the corresponding module (i.e. the CTI Module 416, IVR Module 418, or CRM Module 420). The destination can be one of the numerous adapters (such as CTI Adapter 402 or IVR adapter 404) or an application client (e.g. Applet or Java/VB application) or the Module Container (MC) 405. The MC 405 houses the various business logic components (The Business modules are depicted in FIG. 3 collectively as 450 and in FIG. 4 individually as 416, 418, and 420) to process the incoming XML messages. Each module in the MC can be configured individually to perform some coherent piece of logic. For example, the CTI Module 416 handles all incoming CTI XML messages to and from the CTI server 102 and the Softphone 650. The CTI Module 416 shown in FIG. 10 can be further configured to handle different types of CTI XML message differently than the CTI Transfer-Event (shown in FIG. 20) message.

The Client Tier 600 includes applet container 608 and application client container 610. The applet container houses an applet 609, which in the example system is a Java Applet. The Applet Container 608 is the JVM of the web browser (e.g. Microsoft Internet Explorer, Mozilla). In the case where a client application 611 is non-Java then the container 610 is the operating system of the machine in which the application is running.

The Web Tier 602 includes Web Container 612, which houses both JSP and Servlet components, which can be any commercially or open source implementation (i.e. Tomcat, WebSphere Application Server, or Web Logic Server) message.

The EJB Tier 604 includes the EJB Container 200 (shown in greater detail in FIG. 4) which can be any off-the-shelf J2EE 1.3 compliant application server (i.e JBoss, WebSphere Application Server, or Web Logic Server). The various modules and functional components of the EJB Container 200 of the EJB Tier 604 are described in greater detail below under "Distributed Architecture."

The EIS Tier 606 includes the data sources from enterprise information systems, which may range from ERP, CRM, SCM, to relational databases.

Distributed Architecture

Figure 36:
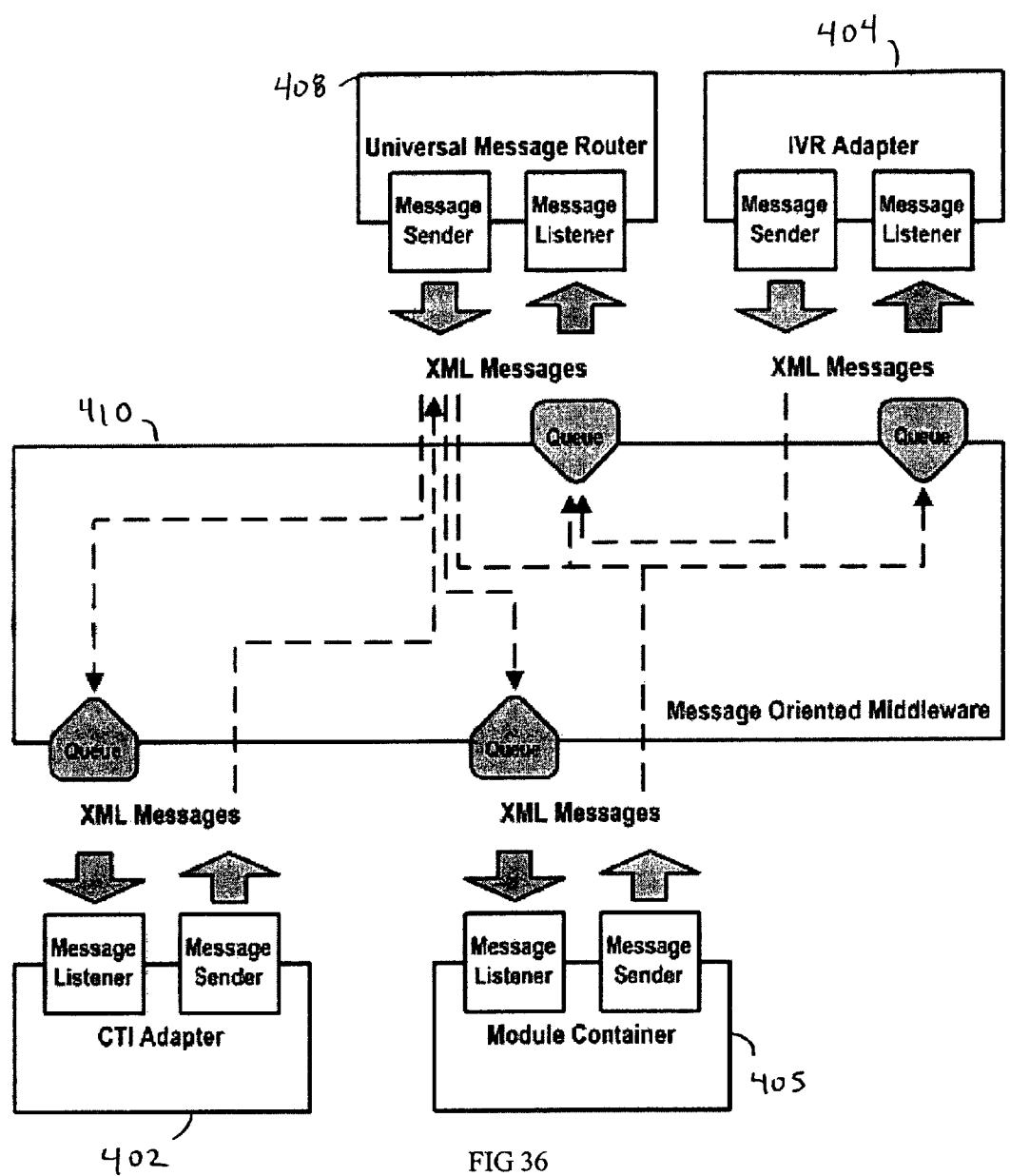
FIG. 36 is a schematic diagram showing the message flow between various components of the current invention.

As illustrated in FIG. 4, the various components and functional elements of EJB container 200, as well as the CTI adapter 402 and IVR adapter 404 can be distributed across multiple physical systems with the current invention, with messages being passed between each module in XML format. The message flow between distributable components is shown schematically in FIG. 36.

Figure 8:
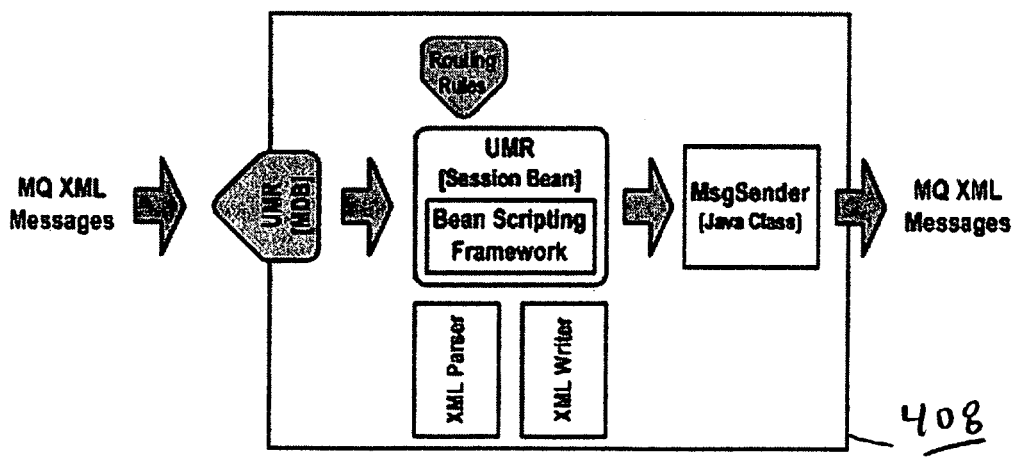
FIG. 8 is a schematic diagram showing the UMR module of the present invention.

Generic CC Portal Adapter 302 will listen/receive for incoming events (e.g. Ringing, Hang-up, Hold, Un-hold, etc. . . . ) from the CTI server 102. The event data is composed into a XML message, using the built-in XML Writer using the CC Portal xCTL XML schema for CTI Events. Each adapter has its own event library to translate the events into its corresponding XML format. The syntactically correct XML message is sent to the predefined queue of the MOM, using a MQ Client (the client developed using the MOM client API). At the other end, the UMR listens on this queue for incoming messages (as shown in FIG. 8). The UMR employs a Message Driven Bean (MDB). Once the MDB receives the XML message it will invoke a Session Bean (SB) and pass the message to it. The UMR module acts as the entry point to the CC Portal Application Server 200. All the connected components (e.g. CTI server, IVR system, softphone, etc) send messages to the UMR's in-queue. The UMR performs the XML transformation and intelligent routing of these messages to reliably connect and coordinate the interaction of between these connected components across the CC, and between CCs.

Figure 9:
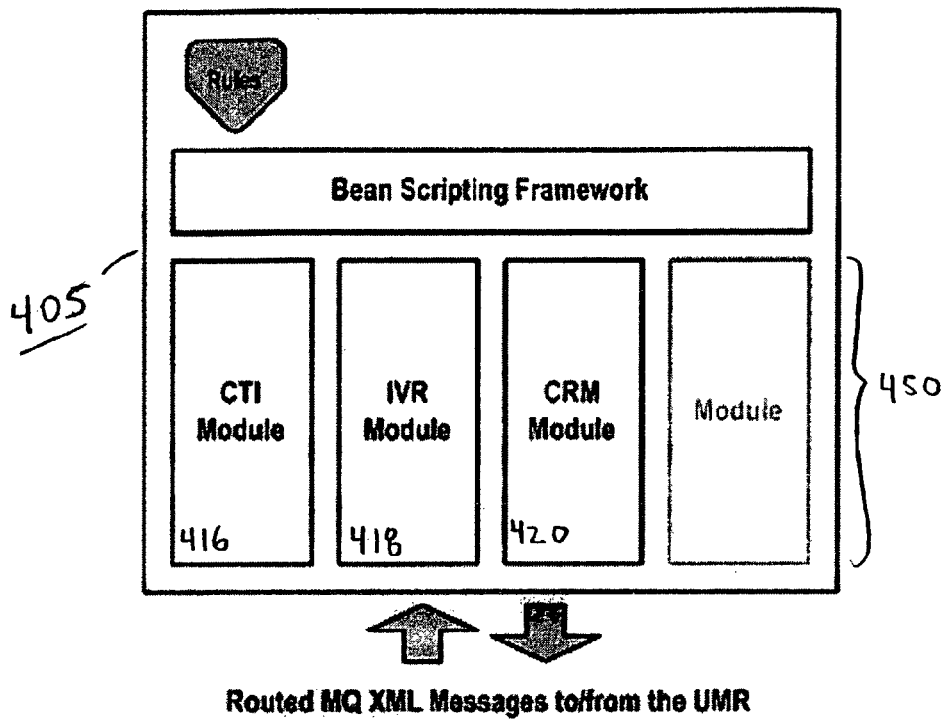
FIG. 9 is a schematic diagram showing the module container of the present invention.

SB will call the helper classes to parse the XML message and extract to key attributes. These attributes will govern the next destination of the XML messages. SB will pass these attributes to the Bean Scripting Framework (BSF), and the BSF will return the destination queue based on the pre-loaded 'Routing Rules.' The Message Sender within the UMR will dispatch the message to the destination queue. For each module that is contained in the Module Container (MC) (shown in greater detail in FIG. 9)), there is a dedicated queue. This queue name is configured in the Module Descriptor XML file, as well as in the UMR Routing Rules file. The MC acts as a in-memory repository of business-logic components. These business-logic components are broadly categorized into CTI, IVR, and CRM. The MC allows new components to be installed/registered in the BSF framework (more detailed information regarding registering new Java Objects in the framework can be currently found at http://jakarta.apache.org/bsf). Once the new components are installed/registered, the UMR is will send messages to the corresponding queue of each module that is registered. Once the message arrives into the queue the MDB of the module is activated and the corresponding business logic is executed. Upon receiving a message in the queue the MDB listening on that queue will be invoked and the message is passed to the SB (shown in FIG. 10). The SB will request the BSF to lookup the corresponding rule for handling the message request.

Figure 10:
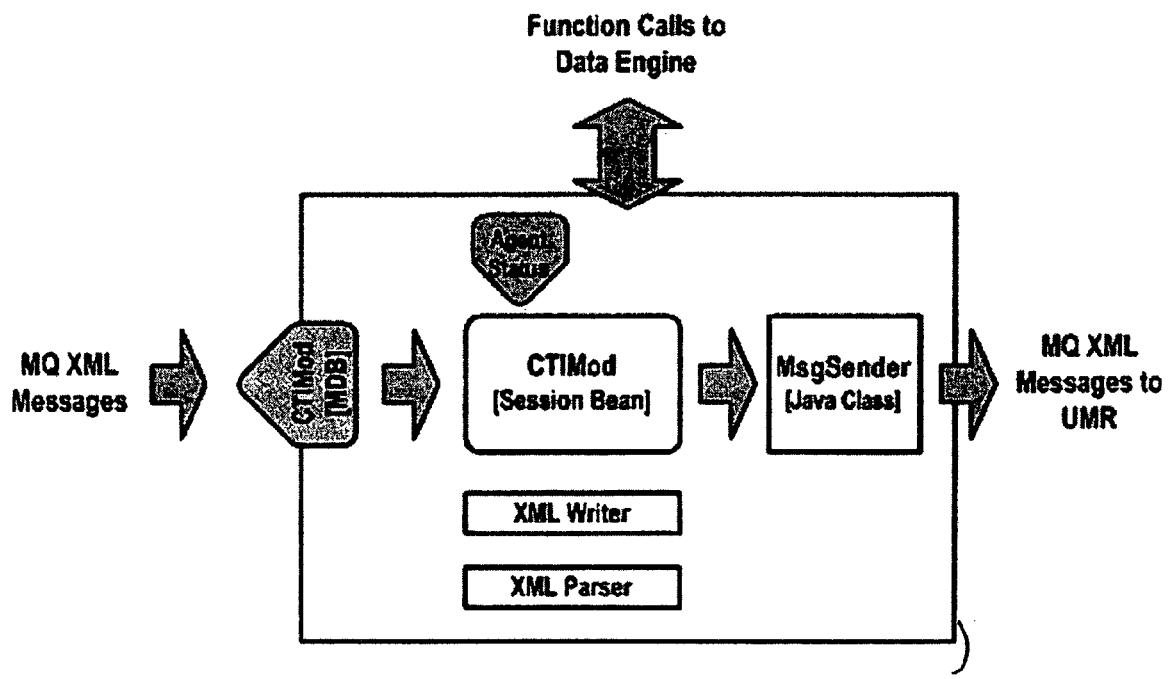
FIG. 10 is a schematic diagram showing the CTI module of the present invention.

The CTI module 416 shown in FIG. 10 is responsible for handling CTI events and requests. A CTI message is received by the CTIM's MDB. CTI messages are originated from the CTI Adapter 402, Softphone 650, or any other client application that is connected to the CC Portal. The CTI module 416 will handle the message event or request as defined by the rules that are configured in the BSF.

Once the business logic is identified, the SB will make a data request (remote function call) to the Data Engine (DE) 426, and query the Agent status data from the Bulletin Board (BB) 407. Once the message is handled, the result is composed into another XML message (using the xCDL schema, as defined on FIG. 18) and sent to the UMR's listening queue.

The function of CTI adapter 402 (shown in greater detail in FIG. 7) is two fold. First, it listens to or monitors the CTI Server 102 attached to it, and also acts as a CTI request sender to the CC Portal. For instance, when the phone rings, the CC agents softphone 650 (shown in FIG. 15) should reflect the ringing event. This ringing event is monitored by the CTI adapter 402 and is passed through to the CC Portal. Correspondingly, the call answer request, generated by pressing the answer button on the softphone is sent to the CTI server 102 via the CTI adapter 402. The softphone 650 can be deployed either in applet form 609 using the applet container 608 (shown in FIG. 6), or in portlet form 220 using a portlet container.

Figure 11:
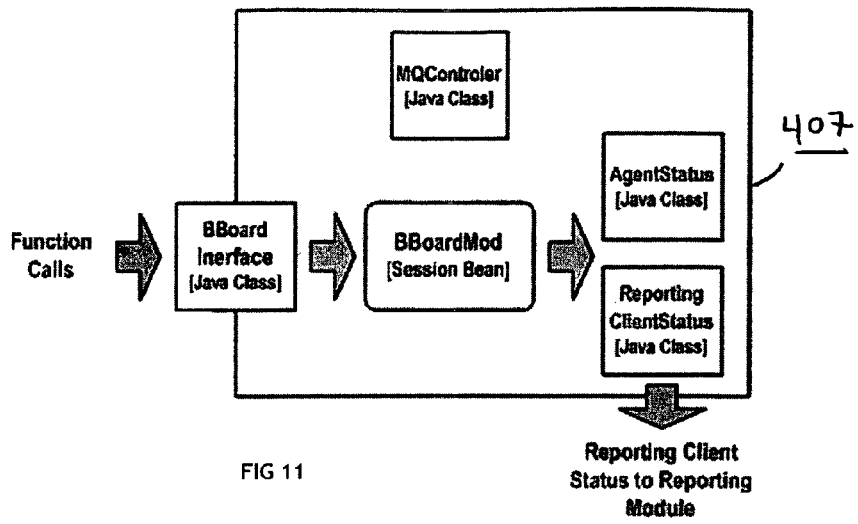
FIG. 11 is a schematic diagram showing the bulletin board module of the present invention.

The Bulletin Board (BB) 407 (shown in greater detail in FIG. 11) acts as an in-memory bulletin board to mark the status of various components that are connected to the CC Portal. In particular, it records the status of the CC agents and supervisors. The status information recorded includes agent status (Ready, Not Ready, Logged in, Logged out, etc) and the timestamp associated with the same. It also records which MOM queue is assigned to which component that is connected to the CC Portal, be it a Softphone, or the CTI Adapter 402. BB 407 also implements an interface (get and set methods) to share and update the recorded status of other connected components. For instance, the CTIM may request to change the status of a particular agent to Ready status once it receives an acknowledgement from the CTI Adapter 402. The BB 407 contains a HashTable data object to store information. The functions of the BB are to register the various client applications that connect to the CC Portal. The BB keeps track of the MOM queues that are dynamically created to the clients. If the client applications are not registered in the BB, the BB will create and assign a MOM queue to each unregistered application. This procedure is performed by the MQController object as illustrated in FIG. 11. The BB also provides specific functions to the CTI Module, including retaining the call center agent's statuses (e.g. Login, Logout, Ready, Not Ready, etc. . . . ). The BB exposes these functions to other modules to query the bulletin board data by way of the AgentStatus object and the ReportingClientStatus object.

Figure 14:
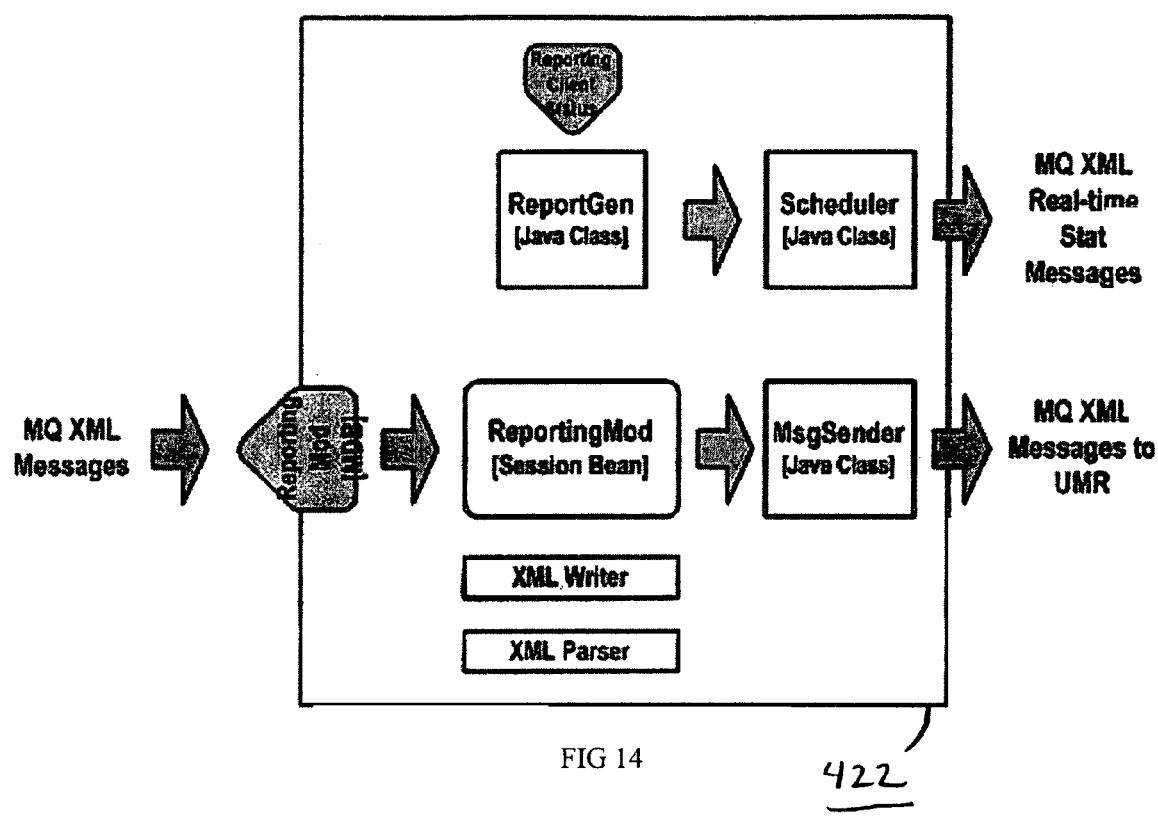
FIG. 14 is a schematic diagram showing the reporting engine of the present invention.

The reporting engine 422 (shown in greater detail in FIG. 14) provides services to client applications that require real-time and historical data about a particular call center. Such call center data may include agent statistics, queue/skill statistics, and call statistics. Unlike the SS 424, the Reporting Engine 422 accumulates data from all components that are attached to the CC Portal. This accumulation of data is made possible by the UMR. The UMR, once the messages are received, transforms the original message into another message format based on rules defined in the BSF. In addition, and most importantly, the UMR sends a copy of the Event or Request to the reporting engine.

Figure 12:
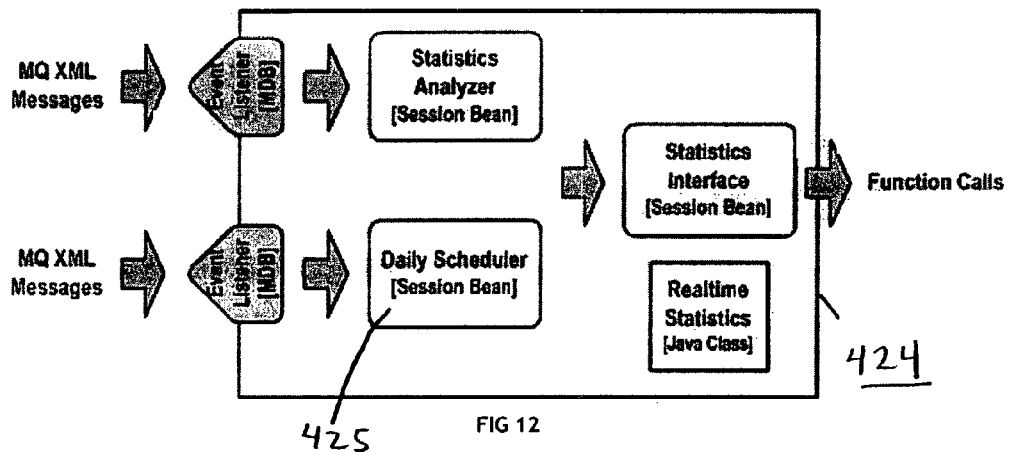
FIG. 12 is a schematic diagram showing the stat server module of the present invention.
Figure 13:
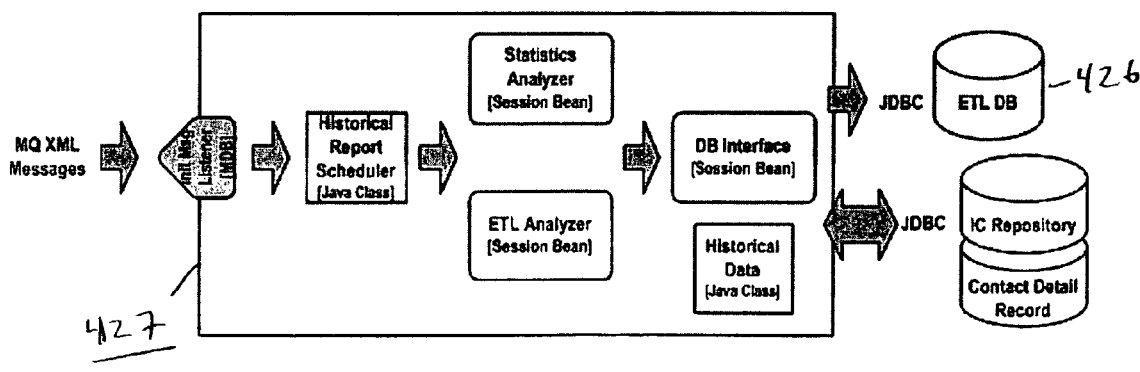
FIG. 13 is a schematic diagram showing the historical reporting module of the present invention.

The CC Portal is able to accumulate stat server 424 data from the event messages that are routed through the UMR 408. The UMR is configured to duplicate and reroute these 'interesting' messages to the Stat Server 424 for extraction, transformation, and logging (shown in FIG. 12). Stat Server 424 keeps a set of all statistics in a HashTable for real-time statistics. The Scheduler 425 within the Stat Server 424 places this data periodically in the Extraction Transformation and Loading (ETL) database for historical reporting purposes. The ETL database is a set of tables that are pre-defined to store CC related data. The scheduler transforms and stores the raw CTI data into these pre-defined tables. These tables can be used by third-party reporting tools such as Crystal Decision™ (more detailed information can be currently found at http://www.CrystalDecisions.com) or BRIO™ Software (more detailed information can be currently found at http://www.brio.com). This batch process is done in the Historical Reporting Module 427 of the Stat Server 424 shown in FIG. 13. The Historical Reporting module 427 receives messages which are sent from the reporting engine 422. They are analyzed using the 'Statistics Analyzer,' and the ETL Analyzer transforms and writes the transformed or report-ready data to persistence storage. The persistence storage can be any JDBC compliant database—such as DB2, Oracle, or MS SQL. In turn, these report-ready data can be used to create more meaningful CC reports using third-party reporting tools such as Crystal Decisions™ or BRIO™.

The SS 424 (shown in greater detail in FIG. 12) accumulates CTI and other CC related data from the Reporting Engine (RE) 422. The SS 424 is responsible for pumping real-time statistics to client applications that require them.

This is done using the 'Daily Scheduler' on pre-configured intervals (five seconds being the minimum interval between updates). One such client application that requires real-time statistics is the CC Softphone. The SS's real-time statistics which are stored in the 'Real-time Statistics' Java classes will be initialized at midnight on each day.

The Data Engine (DE) 426 consolidates data from ACD/PBXs 104, IVRs 108, desktops 110, databases 204, and other resources. All of the call detail information accumulated by the DE 426 is consolidated in a relational database, which is accepted via the Reporting Engine 422 and third party SQL or JDBC tools. Enterprise-wide or site-specific contact center data can be viewed and the format and amount of information accessed are defined by each user.

Figure 16:
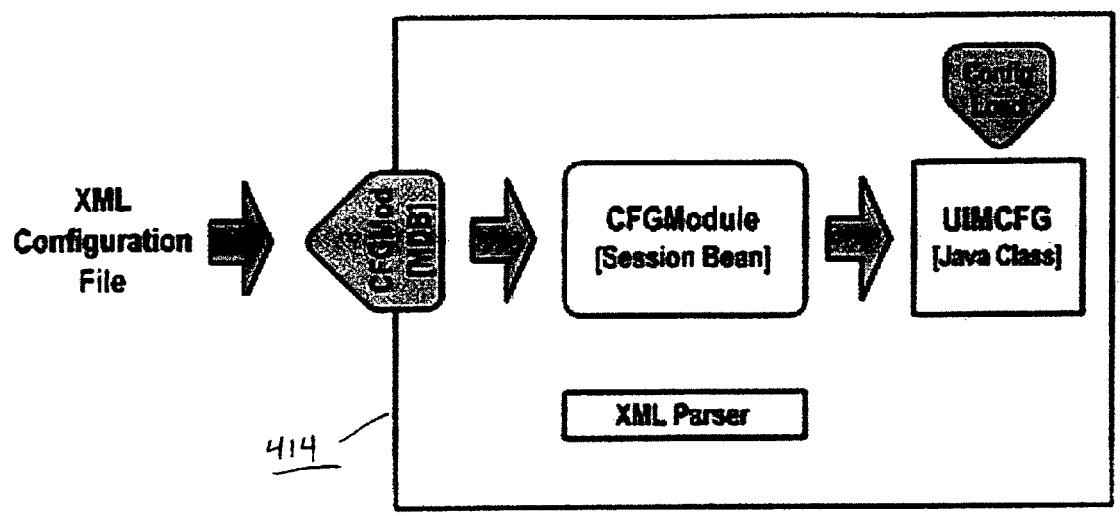
FIG. 16 is a schematic diagram showing the configuration module of the present invention.

The Configuration Module (CM) 414 is shown both in the distributed system architecture of FIG. 4, and in more detail in FIG. 16. The CM maintains a running configuration of the CC Portal platform. At startup, the CM loads the configuration files, which are stored in an XML database or as XML files, into the UIMCFG helper classes. The CM acts as the in-memory repository to store and retrieve XML-based configuration data for the entire CC Portal. When the CC Portal starts it loads the XML configuration files from persistence storage. The persistence storage can be any database that supports JDBC (DB2, Oracle, SQL Server) or any Native XML database (such as Xindice by Apache Software Foundation). The loaded XML documents are parsed and a DOM object is kept in memory. By doing so the request/response time can be significantly reduced, resulting in lower response times. On request of configuration data from any CC Portal component, the DOM tree is searched for the requested configuration data. CM uses standard-based XML query mechanisms (XPath, XQuery) to find the data from the DOM object. The result is sent as a XML message to the UMR for routing purposes.

The UMR 408 is shown both in the distributed system architecture of FIG. 4, and in more detail in FIG. 8. The UMR 408 acts similar to an enterprise service bus, combining standards-based messaging, Web services, XML transformation, and intelligent routing to reliably connect and coordinate the interaction of applications across platform, and between enterprises. The UMR 408 is designed to span a large number of diverse applications in highly-distributed environments. The UMR 408 treats all applications as services regardless of how they are connected to the MOM 410.

Figure 5:
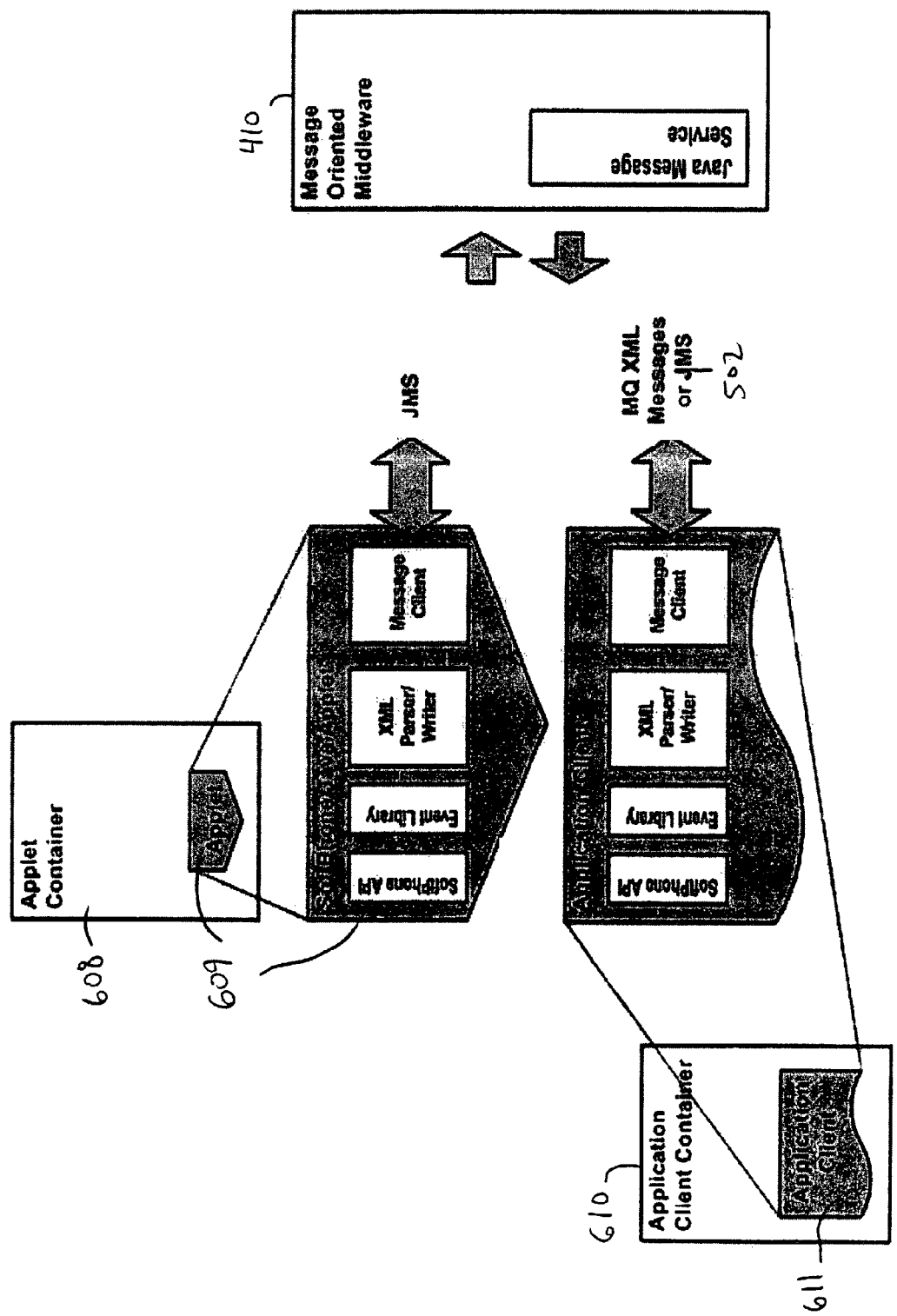
FIG. 5 is a schematic diagram showing the client connection implementation using MOM.

As stated earlier, the UIM CC Portal functions as a MOM application (shown generally in FIG. 5), connecting traditional CC components (from an existing enterprise application) to the CC Portal via a suite of adapters. The adapters transform component events and related data into a set of XML messages based on sets of predefined schemas, such as xCTL, xCDL, xIVRL, xDQL, xCRML, and xRIFDL. FIG. 18 shows the XML Schema definitions used in conjunction with the current invention. Upon receiving the various XML messages, the CC portal transforms and routes them to predefined application modules (in the module container) for handling.

The application client container resides in the application client container 610. The application container 610 is the Java Virtual Machine (JVM), or if the client application is non-Java then the container is the operating system of the machine, in which the application is running on.

The application client interfaces with MOM 410 through MQ XML messages, or JMS 502. The MOM 410 can be any commercially available MOM, which complies with the Sun Microsystems Java Message Service (JMS). The system has been known to work with the following MOM's: IBM WebSphere™ MQ and SonicMQ. The MOM then interfaces with a java applet (i.e. SoftPhone applet 609) through JMS. The Java Softphone applet 609 resides in the applet container 608. The Applet Container 608 is the JVM of the web browser (e.g. Microsoft Internet Explorer™, Mozilla™).

Figure 17:
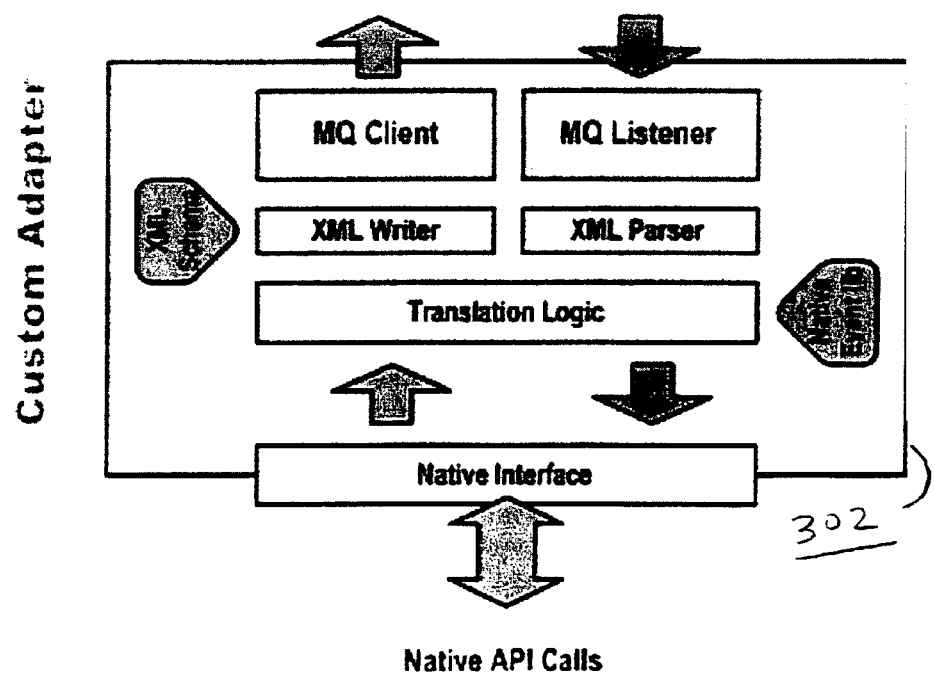
FIG. 17 is a schematic diagram showing the customer adapter of the present invention.

The customer adapter shown in FIG. 17 is a generalized schematic diagram of an 'adapter' used to connect an external component, such as CTI servers, IVR systems, CRM, etc.

System Message Flow

The system also includes message flow architecture 300 shown schematically in FIG. 3, comprising a customer adapter 302, UMR 408, and module container 405. In one aspect of the present invention, each logical group of components can be custom configured via a configuration file or a rules file to accommodate a set of business operations. The custom adapter 302 (which can be either a CTI Adapter 402, IVR Adapter 404, or other adapter) can be easily built by encompassing a message sender, translating the native events and data to the CC Portal XML message format, and dispatching it to the UMR 408. The routing rules are added or modified to by edit the JavaScript rules file of the UMR 408 to reflect the new message routing destinations. If needed, edit the JavaScript business rules of the MC to do the required business logic.

As the CC Portal architecture communicates with its individual components using the MOM 410, the CC portal components are able to be deployed in a distributed environment. For example, an adapter 402 or 404, the UMR 408, and the MC 405 can all be deployed in separate machines. In addition, each component relies on the MOM 410 to send and receive messages between them, and each message need not be relevant to the preceding one. Different or multiple instances of each component are able to be deployed on other machines.

The customer adapter 302 implements the native interface of the corresponding CTI, IVR or EIS. For example the Genesys Labs™ Inc. T Server (http://www.genesyslabs.com) adapter implements the JTAPI (Java Telephony API), and the Avaya™ CvCT (http://www.avaya.com) adapter implements the TSAPI (Telephony Services API)

The Translation Logic (TL) 304 layer translates native events and data into a coherent XML messages for the CC Portal. The TL layer uses an event library and the XML Writer classes write the well formed XML messages based on the XML schemas listed in the table of FIG. 18. These composed XML messages are sent to a MOM queue assigned to the adapter 302. This queue name together with the queue manager name is defined in the CC Portal configuration layer. The actual passing of the message is done by implementing a MOM client. This client implementation is both arbitrary and MOM specific. A generic adapter, like the MOM client, also implements a MOM listener. The MOM listener listens to a particular queue in the MOM. Whenever listener receives an XML message from the UMR (as shown in FIG. 3), it is handed off to the XML Parser classes to parses the XML and to create a Document Object Model (DOM) object.

The DOM object is passed to the TL layer, which does a reverse lookup on the Native Event library. Once the native method calls are identified the Native interface makes the function calls.

The UMR listens on a MOM queue for incoming messages (shown in greater detail in FIG. 8.) The UMR employs multiple instance of Message Driven Beans (MDB) listening on a single queue. Once a MDB receives an XML message it will invoke a Session Bean (SB) and pass the message to it. The SB will call the helper classes (XML Parser classes) to parse the XML message and to extract the key attributes. These attributes will govern the next destination of the XML messages. SB will pass these attributes to the Bean Scripting Framework (BSF), and the BSF will return the destination queue based on the pre-loaded 'Routing Rules.' The Message Sender within the UMR will dispatch the message to the destination queue. Before dispatching, the SB rewrites/transforms the message using the corresponding XML schema (FIG. 18) that relates to the destination.

For each module that is contained in the Module Container (MC) 405 (shown in greater detail in FIG. 9), there is a dedicated queue. This queue name is configured in the Module Descriptor XML file, and additionally in the UMR Routing Rules file. Upon receiving a message in the queue, the MDB listening on that queue will be invoked and the message is passed to the SB (shown in FIG. 10) The SB will request the BSF to lookup the corresponding rule for handling the message request.

The Bean Scripting Framework (BSF) (which is licensed to Apache Software Foundation) is a set of Java classes, which provides scripting language support within Java applications, and access to Java objects and methods from scripting languages. BSF allows one to write JSPs in languages other than Java while providing access to the Java class library. In addition, BSF permits any Java application to be implemented in part (or dynamically extended) by a language that is embedded within it. This is achieved by providing an API that permits calling scripting language engines from within Java, as well as an object registry that exposes Java objects to these scripting language engines.

User Interface

In a further aspect of the UIM CC Portal System, a graphic user interface (GUI) may be included for allowing a human operator to interact with the web enabled application components. The GUI and logic of the UIM CC Portal is clearly separated using the n-tier architecture. The CC Portal generally employs an enterprise information portal approach to the user interface. The CC Portal user interface architecture is based on Jetspeed™ EIP from Apache™ Software Foundation; however, Jetspeed can be substituted by any other EIP product available that complies with the Jetspeed 'Portlet' architecture. An example of such EIP is the IBM WebSphere™ Portal Server.

Jetspeed is an Open Source implementation of an Enterprise Information Portal, using Java and XML. A portal makes network resources (applications, databases, and so forth) available to end-users. The user can access the portal via a web browser, WAP-phone, pager or any other device. Jetspeed acts as the central hub where information from multiple sources is made available in an easy to use manner.

The data presented via Jetspeed is independent of content type; this means that content from, for example XML, RSS or SMTP, can be integrated with Jetspeed. The actual presentation of the data is handled via ates XSL and delivered to the user for example via the combination of Java Server Pages (JSPs) and HTML. Jetspeed provides support for templating and content publication frameworks such as Cocoon™, WebMacro™, and Velocity™.

Overall System Process Flow and System Events

Figure 19:
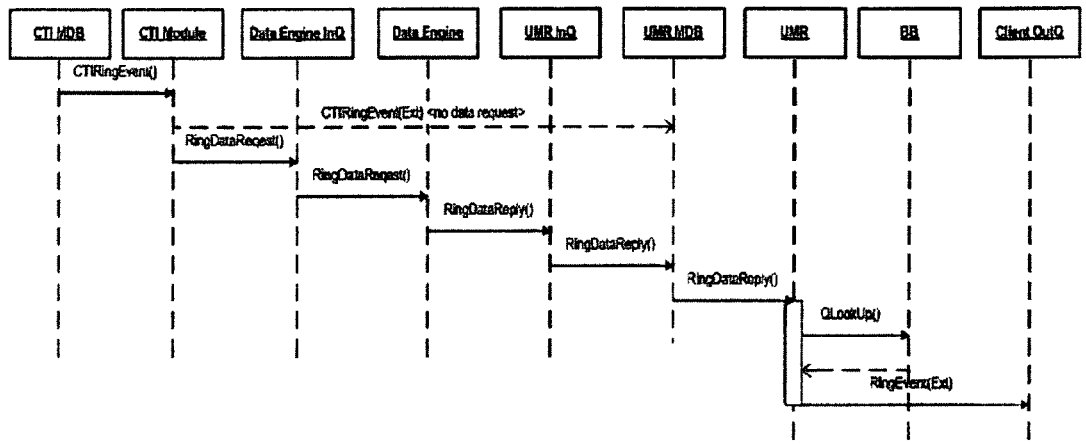
FIG. 19 is a process flow diagram showing an incoming call event flow according to the current invention.

Looking now to FIGS. 19-34, schematic flow control diagrams are provided to illustrate the flow of messages throughout various system components for various system events. FIG. 19 shows an Incoming Call Event wherein CTI Ring event are coming from CTI Adaptor 402 through the MOM where CTI MDB will listen to that queue and have CTI Ring event alert. If no attached data is included, the CTI Module 416 will directly forward the event to UMR MDB, or else the CTI Module 416 will get the attached data from the DE 426 and forward the event to UMR MDB with the attached data. Once the event arrived to UMR 408, it lookups in BB Module for the associated queue of where the event should send to and send it to client.

Figure 20:
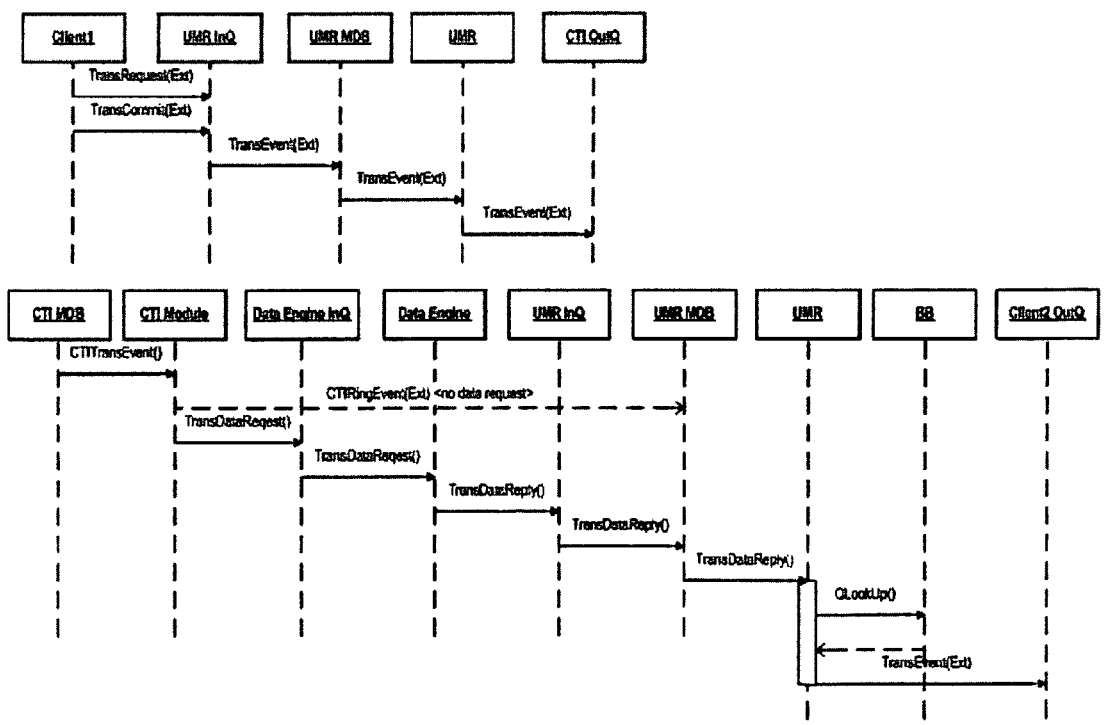
FIG. 20 is a process flow diagram showing a transfer call event flow according to the current invention.

FIG. 20 shows a Transfer Call Event. When the Client requests a transfer, it will send out a Transfer request to the UMR 408. In the UMR 408, it will route the message to CTIOutQ queue in the MOM where the CTI Adaptor is connected. The CTI Adaptor will control the CTI Server to perform a Transfer action and after completion, it will send back a CTI Transfer Event back to where CTI MDB will listen to that queue and have CTI Transfer event alert. If no attached data is included, the CTI Module 416 will directly forward the event to the UMR MDB, or else CTI Module 416 will get the attached data from the DE 426 and forward the event to UMR MDB with the attached data. Once the event arrives at UMR 408, it performs as lookup in BB Module 407 for the associated queue of where the event should send to and send it to that client.

Figure 21:
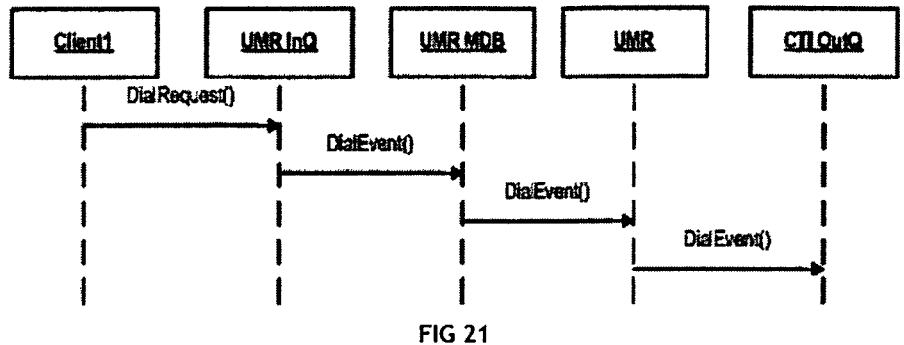
FIG. 21 is a process flow diagram showing a dial call event flow according to the current invention.

FIG. 21 shows a Dial Call Event. When the Client requests a dial call event, it will send out a Dial Request along with the request information and send it to UMR 408 through the MOM. UMR 408 will get the request message and route the message to CTIOutQ where the CTI Adaptor is connected. CTI Adaptor 402 will perform the request action on CTI Server 102.

Figure 22:
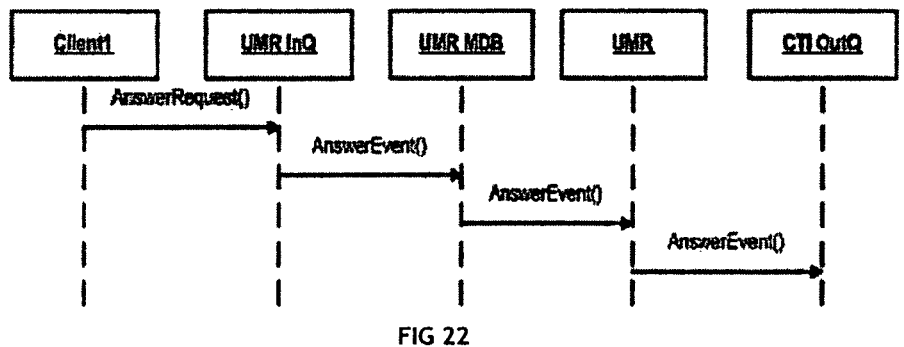
FIG. 22 is a process flow diagram showing an answer call event flow according to the current invention.

FIG. 22 shows an Answer Call Event according to the current invention. When a CTI Ringing Event happens, the Client requests an Answer Call event. It will send out an Answer call Request along with the request information and send it to UMR 408 through the MOM. UMR 408 will get the request message and route the message to CTIOutQ where the CTI adaptor 402 is connected. CTI adaptor 402 will perform the request action on CTI Server 102.

Figure 23:
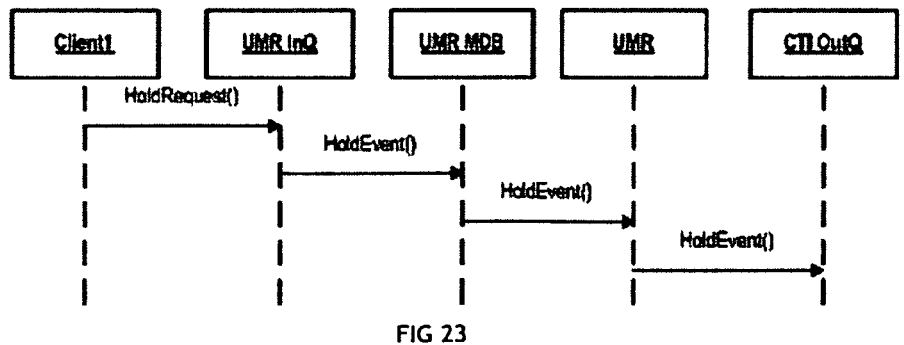
FIG. 23 is a process flow diagram showing a hold/un-hold call event flow according to the current invention.

FIG. 23 shows Hold/Unhold Event according to the current invention. When there is an active call, the Client can requests an hold/un-hold Call event. It will send out a hold/un-hold call Request along with the request information and send it to UMR 408 through MOM. UMR 408 will receive the request message and route the message to CTIOutQ where the CTI adaptor 402 is connected. CTI adaptor 402 will perform the requested action on CTI Server 102.

Figure 24:
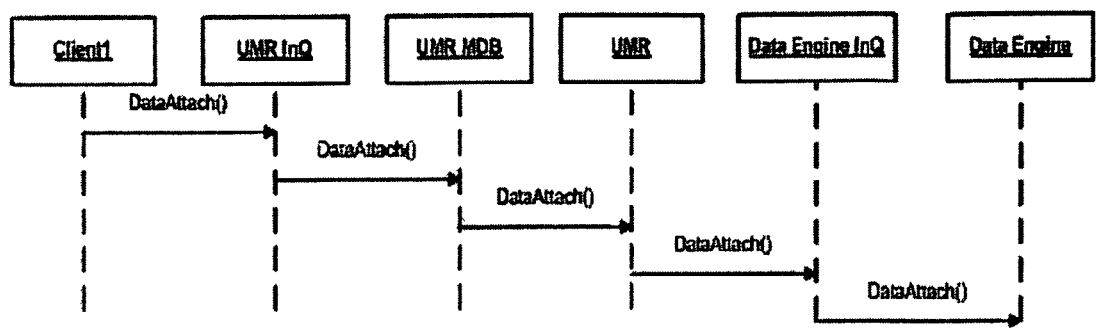
FIG. 24 is a process flow diagram showing an attach data call event flow according to the current invention.

FIG. 24 shows an Attach Data Event by the DE 426 according to the current invention. When the Client performs an Attach Data request, it sends out an attach data request message along with attach data to the UMR 408. UMR 408 then performs a lookup on the attach data key and triggers the DE to add the attached data to the corresponding data block.

Figure 25:
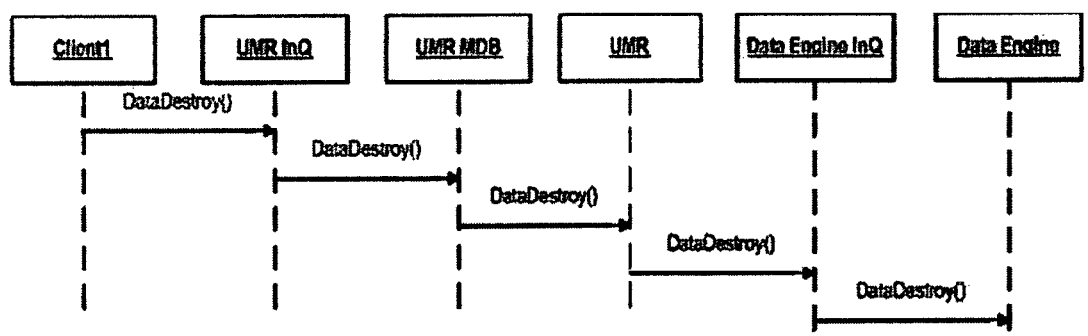
FIG. 25 is a process flow diagram showing a destroy data event flow according to the current invention.

FIG. 25 shows a Destroy Data Event by the DE 426 according to the current invention. When Client does a destroy data request, it sends out a destroy data request message along with attach data key to the UMR 408. UMR 408 then performs a lookup on the attach data key and triggers the DE to remove the attached data to the corresponding data block.

Figure 26:
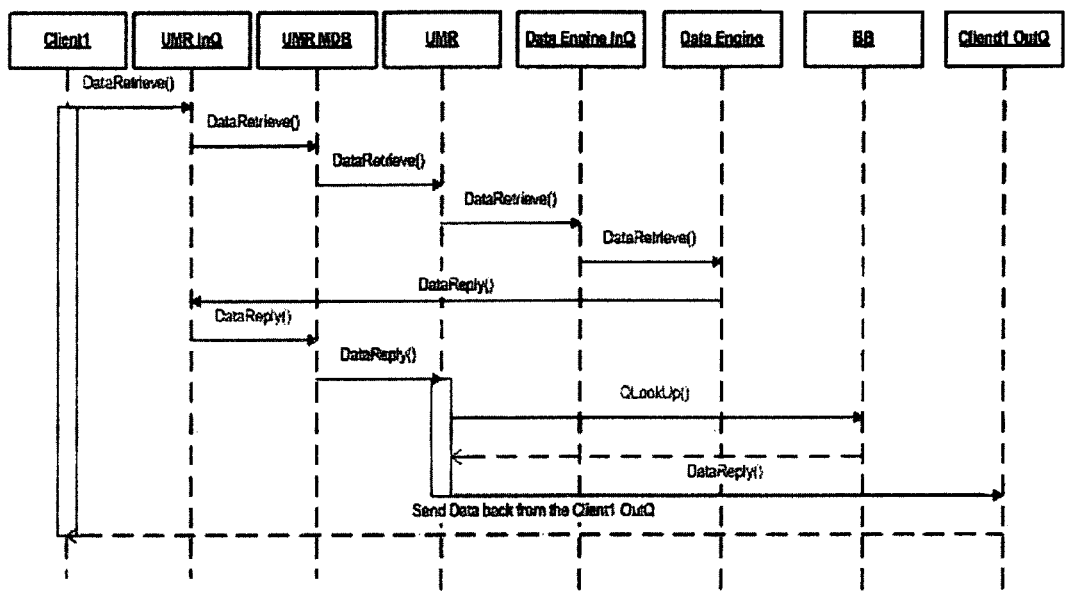
FIG. 26 is a process flow diagram showing a retrieve data event flow according to the current invention.

FIG. 26 shows a Retrieve Data Event by the DE 426 according to the current invention. When Client does a Retrieve Data request, it sends out a retrieve data request message along with attach data key to the UMR 408. UMR 408 then performs a lookup on the attach data key and triggers the DE to get the attached data from the corresponding data block. UMR 408 then performs a lookup on the BB 407 to find the MOM queue where the client is connected and sends the message with attach data content to the client.

Figure 27:
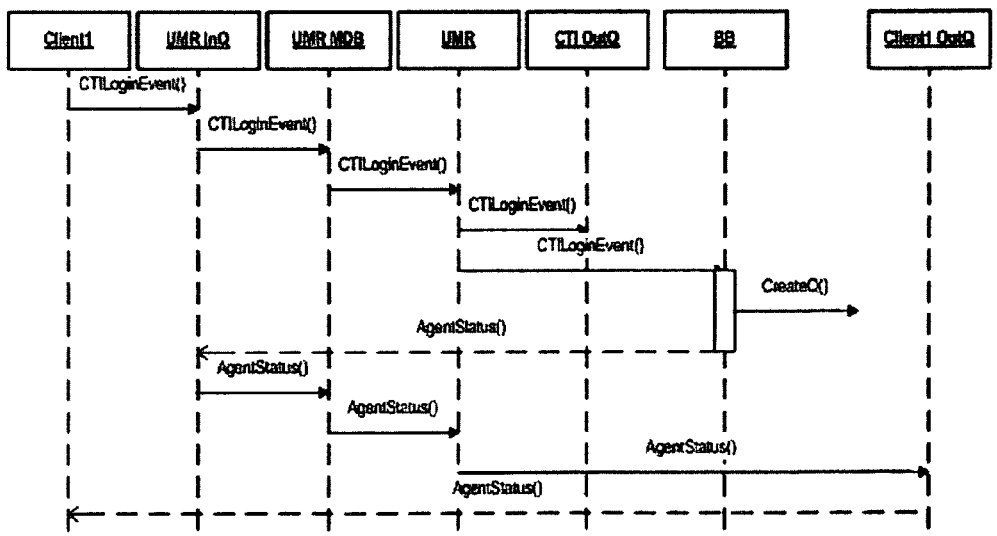
FIG. 27 is a process flow diagram showing an agent CTI login event flow according to the current invention.

FIG. 27 shows a Client CTI Login Event according to the current invention. When a Client requests a CTI login, it will send out a login request message along with all request information to UMR 408. UMR 408 will route the request to CTI Adaptor 402 through the CTIOUTQ queue, where the CTI Adaptor 402 is listening. CTI adaptor 402 will then perform the request action in CTI Server 102 and return a CTI login event message back to the CTI Module 416 via the UMR 408. CTI Module 416 then updates the status of the BB 407 and Create a MOM queue for that client to connect. The CTI login message will then be sent to the client through the MOM.

Figure 28:
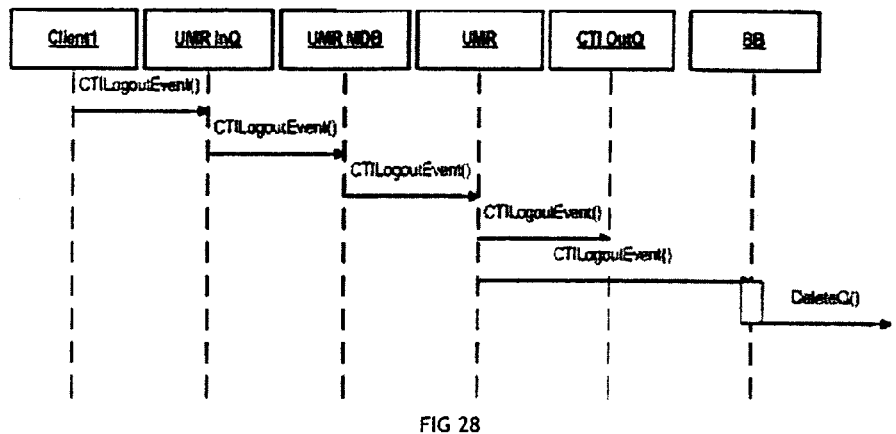
FIG. 28 is a process flow diagram showing an agent CTI logout event flow according to the current invention.

FIG. 28 shows a Client CTI Logout Event according to the current invention. When Client requests a CTI logout, it will send out a logout request message along with all request information to UMR 408. UMR 408 will route the request to CTI Adaptor 402 thru CTIOUTQ where the CTI adaptor 402 is connected. CTI Adaptor 402 will then perform the requested action in CTI Server 102 and return a CTI logout event message back to the CTI Module 416 via the UMR 408. CTI Module 416 then updates the status of the BB 407 and deletes the corresponding MOM queue for that client.

Figure 7:
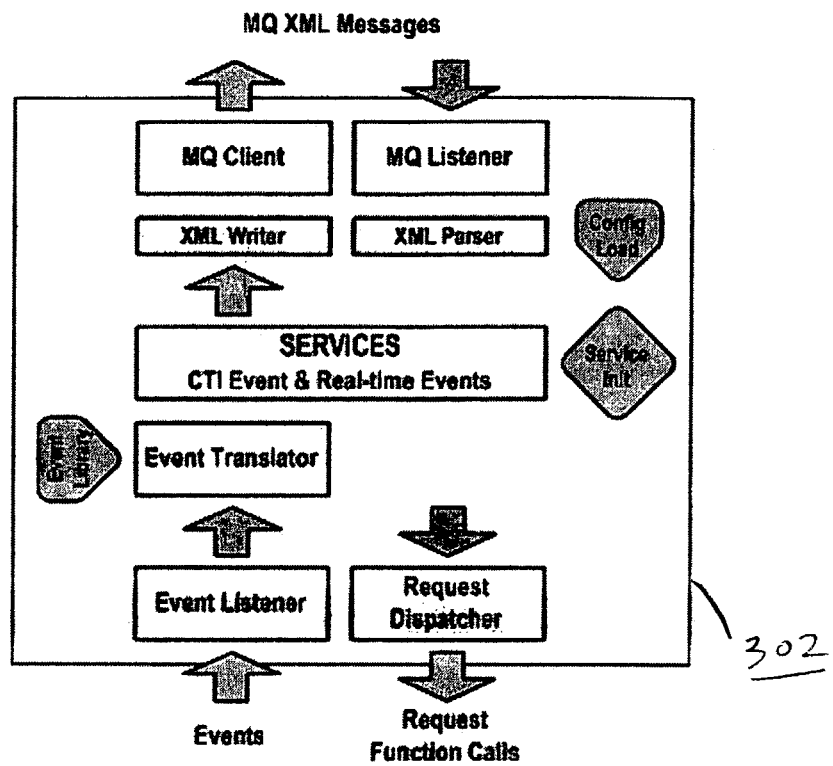
FIG. 7 is a schematic diagram showing the CTI adapter of the present invention.
Figure 29:
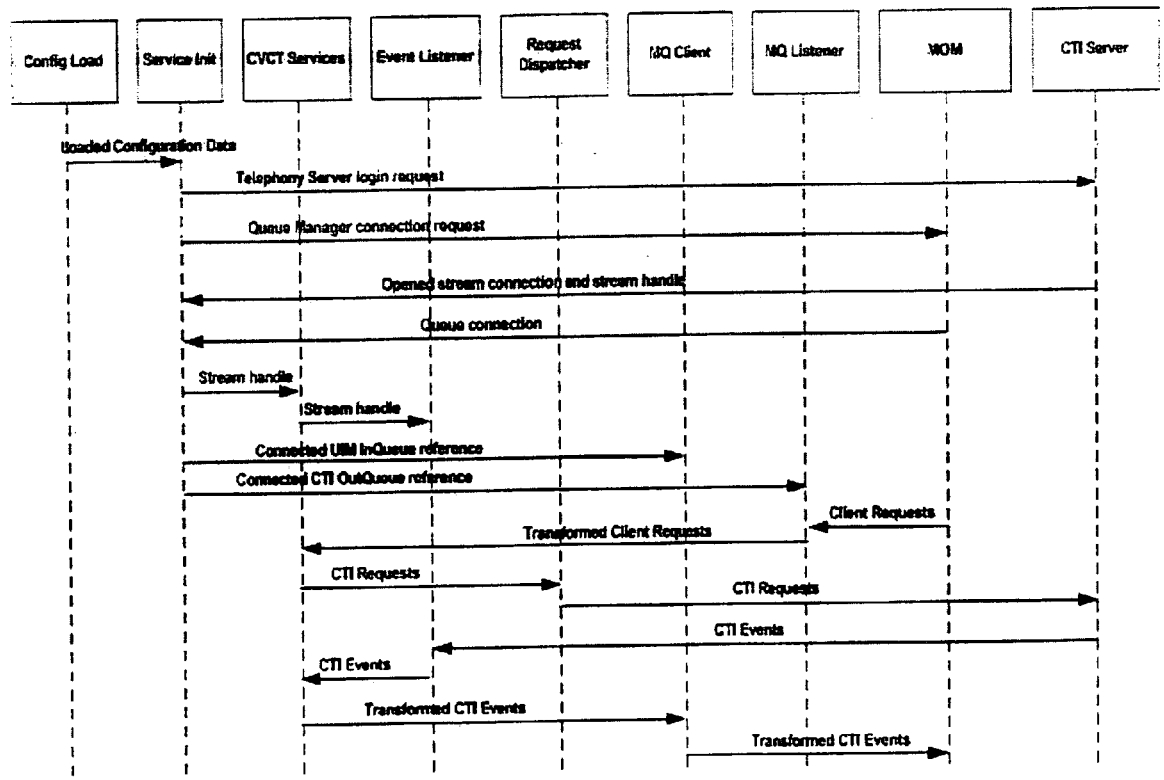
FIG. 29 is a process flow diagram showing an initialization process event flow according to the current invention.

FIG. 29 shows a CTI Adapter 302 Initialization Process according to the current invention. During the CTI Adapter initialization process, the Config Load Module loaded configuration data for connecting to the CTI Server and MOM. The Service Init Module performs the connection using these configuration data. Upon successful connection, relevant connection confirmations are passed on to their respective monitor modules to enable sending outgoing and receiving incoming events and/or messages. Client CTI requests are received from MOM through its listener and requests are transformed into CTI Requests and send to the CTI Server. Corresponding CTI Events are then received from CTI Server, are transformed to CTI XML formats, and send to the MOM through MQ Client (MQ Client is illustrated in FIG. 7—CTI Adapter 302).

Figure 30:
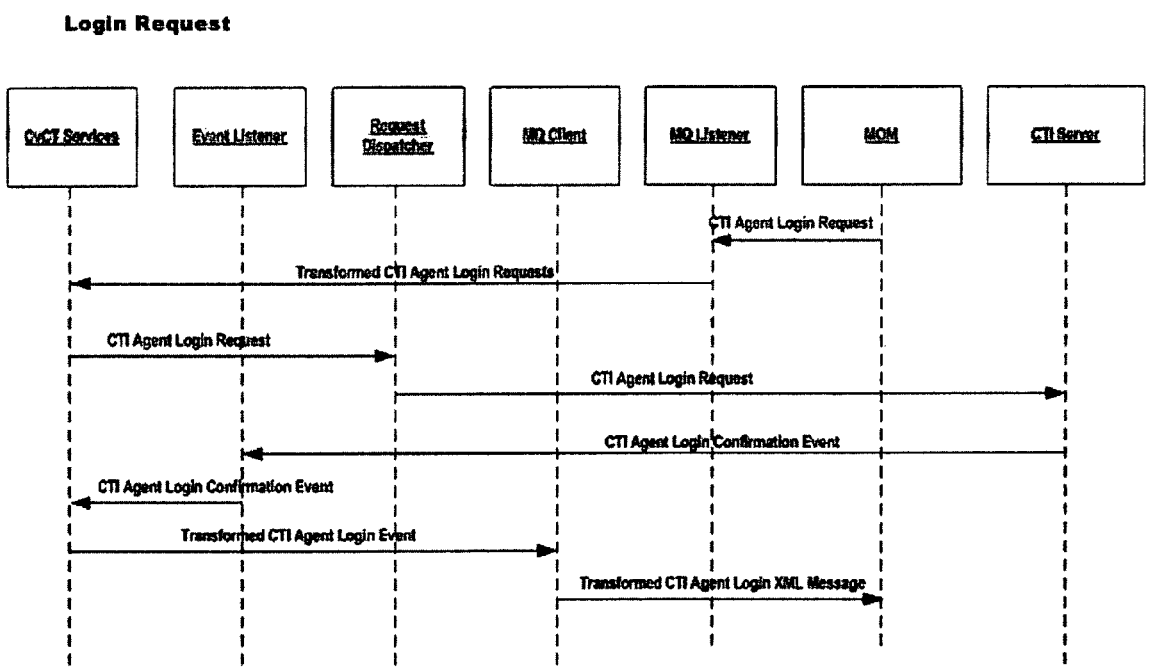
FIG. 30 is a process flow diagram showing a login request event flow according to the current invention.

FIG. 30 shows a CTI Adapter 302 Login Request. The CTI Adapter 402 receives an Agent Login Request sent from Client through MOM. MQ Client transforms the XML format Request and collects agent details and extension number and passes the information to the CVCT Services which makes corresponding CTI Request. Request Dispatcher sends the request to the CTI server. After the CTI Server processes the request and upon successful completion, it sends out CTI Agent Login Confirmation Event and the Event Listener receives it. It sends it to the CVCT Services for status update. CVCT Services then sends the Event to MQ Client to transform it into XML Message and send to the MOM.

Figure 31:
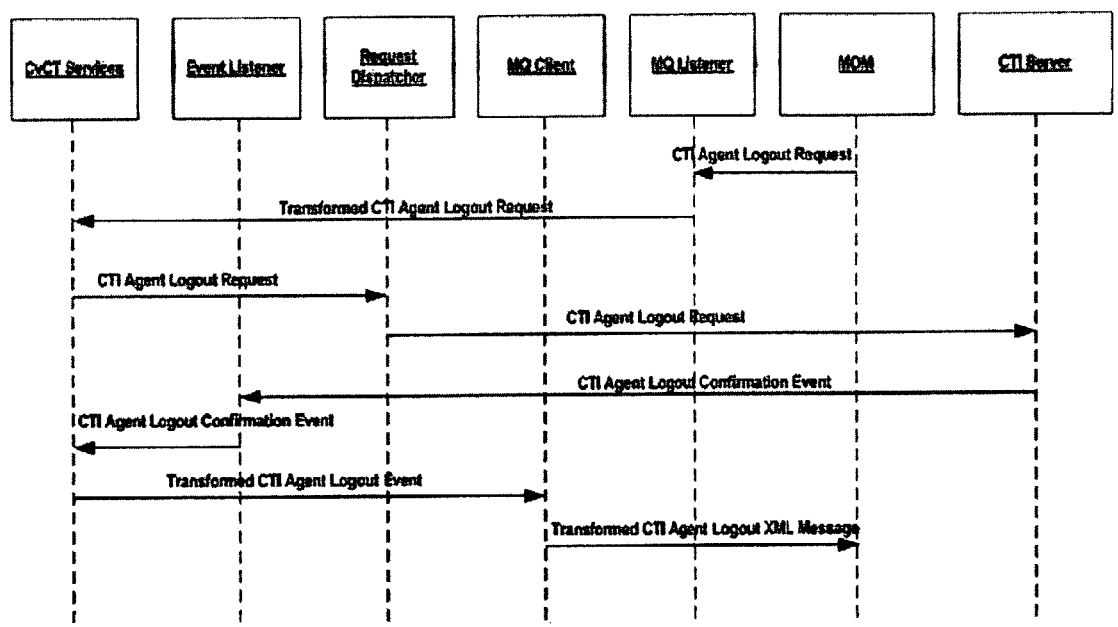
FIG. 31 is a process flow diagram showing a logout event flow according to the current invention.

FIG. 31 shows a CTI Adapter 302 Logout Request according to the current invention. The CTI Adapter 402 receives an Agent Logout Request sent from Client through the MOM. The MQ Client transforms the XML format Request and collects agent details and extension number and passes the information to the CVCT Services which makes corresponding CTI Request. Request Dispatcher sends the request to the CTI Server. After the CTI Server processed the request and upon successful completion, it sends out CTI Agent Logout Confirmation Event and the Event Listener receives it. It sends it to the CVCT Services for status update. CVCT Services then sends the Event to MQ Client to transform it into XML Message and send to the MOM.

Figure 32:
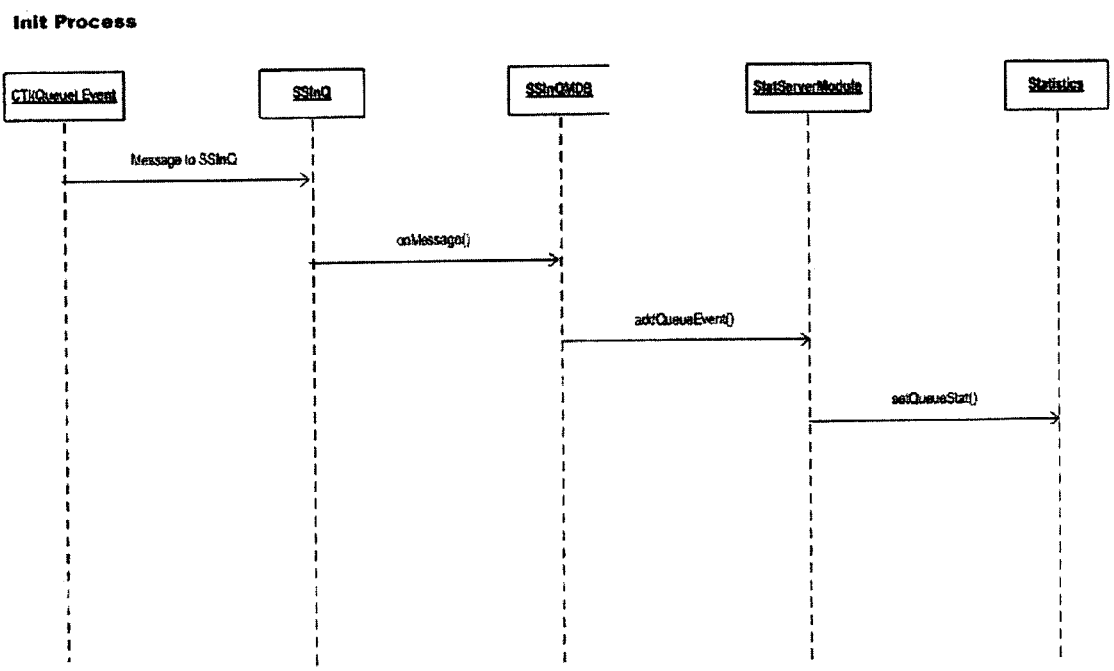
FIG. 32 is a process flow diagram showing an init process event flow according to the current invention.

FIG. 32 shows a Stat Server 424 initialization process according to the current invention. The Stat Server 424 will starts normally when the CC Portal XML configuration file is sent to the InitSSQ queue in the MOM. Once the XML configuration file received, the configuration details will be stored in Statistics EJB. These configuration details include service level, daily reset time, internal extension list, etc. These are essential configuration information for Stat Server 424s data analysis process. For example, the Timer Module will reset the contact center statistics daily at a predefined time defined in the XML configuration file. Whenever the XML configuration file sent to the Stat Server 424, the XML configuration stored in the Statistics EJB will be updated, affecting normal operations of the Stat Server 424. Therefore, the Stat Server can always provide updated statistics of the CC.

Figure 33:
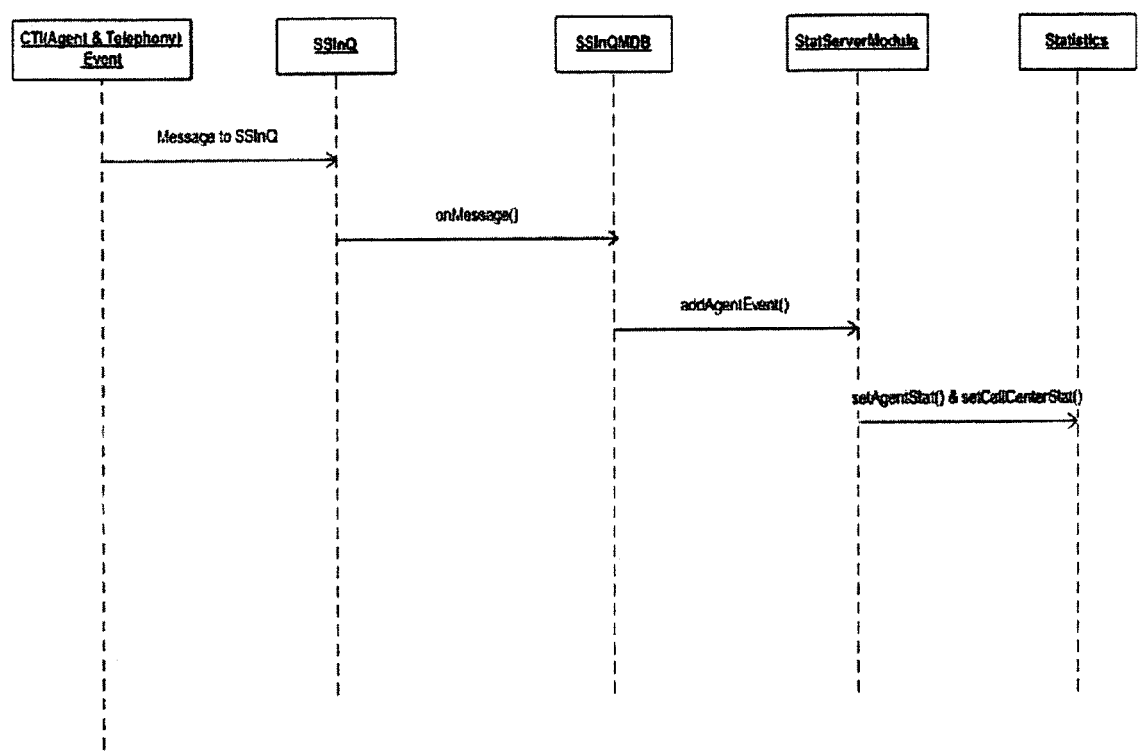
FIG. 33 is a process flow diagram showing an agent statProcess event flow according to the current invention.

FIG. 33 shows the Stat Server 424 Client Statistics Accumulation Process according to the current invention. Once a CTI event message received in SSInQ, the Stat Server's Message Driven Bean (SSInQMDB) will parse and classify the message. The addAgentEvent( ) method will be called if the message is classified as an agent event message. The addAgentEvent( ) method will analyze the message and add agent statistics, such as login/logout, inbound/outbound call statistics and etc, in the Statistics Session Bean. The Statistics Session Bean is an EJB, which centralize all real-time statistics. The Statistics Session Bean, also, provides a remote interface for retrieving the contact center real-time statistics by means of remote procedure call (RPC). Therefore, the Report Server retrieves statistics in a relatively high performance by RPC call.

Figure 34:
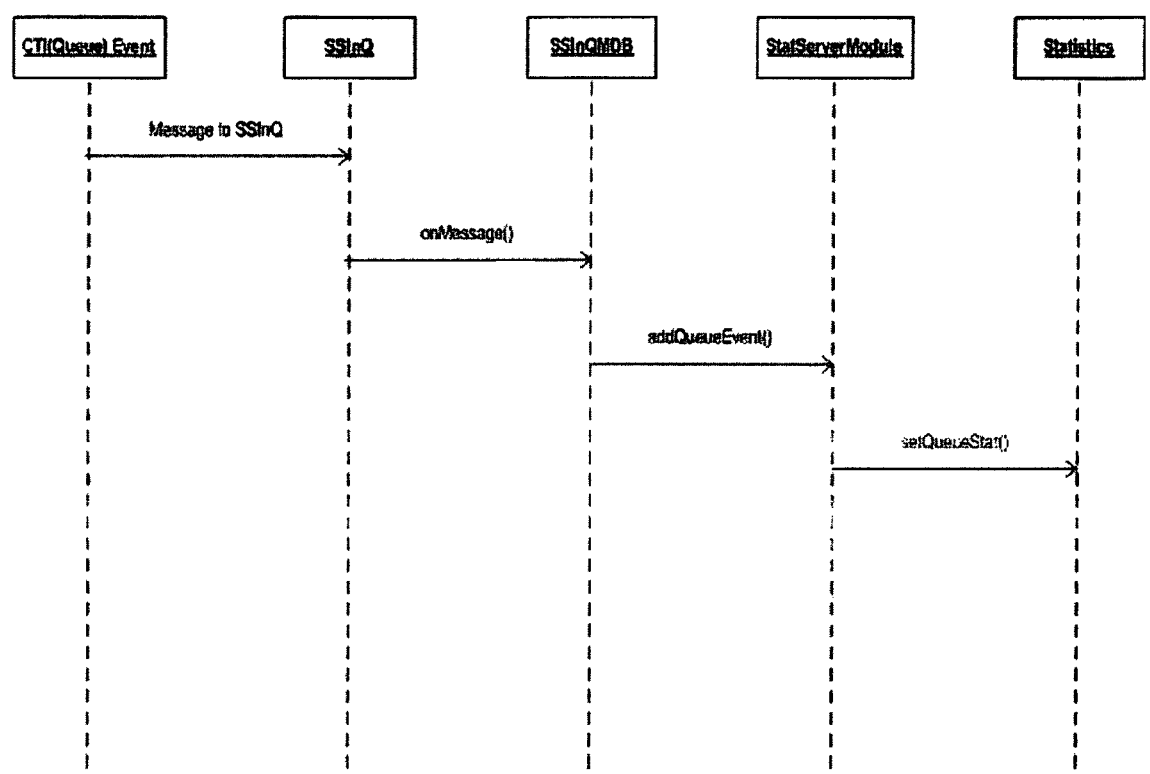
FIG. 34 is a process flow diagram showing a queue stat process event flow according to the current invention.

FIG. 34 shows a Stat Server—Queue Statistics Accumulation Process according to the current invention. Once a CTI event message received in SSInQ, the Stat Server's Message Driven Bean (SSInQMDB) will parse and classify the message. The addQueueEvent( ) method will be called if the message is classified as a queue event message. The addQueueEvent( ) method will analyze the message and add queue statistics, such as queue length, call delivered/abandoned statistics and etc, in the Statistics Session Bean.

The system and process of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality, and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

The acronyms used in the following claims are terminologies well known and adopted in the art, and/or defined throughout the disclosure above.

The invention claimed is:

1. A system comprising:
a physical device performing asynchronous messaging operations on Computer Telephony Integration (CTI) event messages and Customer Relationship Management (CRM) data messages between a browser client and a plurality of servers such that CTI event messages are given a higher priority than CRM data messages.

2. The system as in claim 1, wherein said CTI event messages and CRM data messages originate at a CTI based call center.

3. The system as in claim 2, wherein said CTI based call center comprises at least one of the following CTI system components: CTI Server, IVR System, and ACD/PBX System.

4. The system as in claim 3, wherein said CTI system components are integrated in said physical device using a MOM infrastructure.

5. The system as in claim 4, wherein the CTI system components are integrated independent of any RPC scheme.

6. The system as in claim 4, wherein the CTI system components are integrated independent of following RPC schemes: DCOM, RMI, and CORBA.

* * * * *